United States Patent
Gudat et al.

[11] Patent Number: 5,646,844
[45] Date of Patent: Jul. 8, 1997

[54] METHOD AND APPARATUS FOR REAL-TIME MONITORING AND COORDINATION OF MULTIPLE GEOGRAPHY ALTERING MACHINES ON A WORK SITE

[75] Inventors: Adam J. Gudat, Edelstein; Daniel E. Henderson, Washington, both of Ill.

[73] Assignee: Caterpillar Inc., Peoria, Ill.

[21] Appl. No.: 439,539

[22] Filed: May 11, 1995

Related U.S. Application Data

[63] Continuation of Ser. No. 228,837, Apr. 18, 1994, abandoned.
[51] Int. Cl.⁶ ............................................. E02D 7/26
[52] U.S. Cl. ........................ 364/449.2; 364/424.07; 364/449.7
[58] Field of Search .................. 364/461, 424.07, 364/424.01, 347, 357, 457, 449, 460; 367/69; 356/357

[56] References Cited

U.S. PATENT DOCUMENTS

| | | | |
|---|---|---|---|
| 4,380,050 | 4/1983 | Tanner | 364/461 |
| 4,677,555 | 6/1987 | Goyet | 364/424.07 |
| 4,807,131 | 2/1989 | Clegg | 364/424.01 |
| 4,814,711 | 3/1989 | Olsen et al. | 324/331 |
| 4,820,041 | 4/1989 | Davidson et al. | |
| 4,831,539 | 5/1989 | Hagenbuch | 364/449 |
| 4,915,757 | 4/1990 | Rando | 156/64 |
| 4,965,586 | 10/1990 | O'Neill | 342/357 |
| 5,100,229 | 3/1992 | Lundberg et al. | 356/1 |
| 5,144,317 | 9/1992 | Duddek et al. | 342/357 |
| 5,148,110 | 9/1992 | Helms | 324/323 |
| 5,265,025 | 11/1993 | Hirata | 364/449 |
| 5,287,280 | 2/1994 | Yamamoto | 364/426.03 |
| 5,334,987 | 8/1994 | Teach | 342/357 |
| 5,359,521 | 10/1994 | Kyrtsas et al. | 364/449 |
| 5,375,663 | 12/1994 | Teach | 172/4.5 |

FOREIGN PATENT DOCUMENTS

| | | |
|---|---|---|
| 0139292 | 10/1984 | European Pat. Off. |
| 841124068 | 10/1984 | European Pat. Off. |
| 0297811 | 6/1988 | European Pat. Off. |
| 0297811 | 1/1989 | European Pat. Off. |
| 4133392 | 10/1991 | Germany. |
| 413 339 263.5 | 10/1991 | Germany. |
| 59-021835 | 3/1984 | Japan. |
| 64-174247 | 7/1989 | Japan. |
| WO91/09375 | 12/1989 | WIPO. |

OTHER PUBLICATIONS

GPS World Newsletter Oct. 28, 1993 6 pages.
Spectra–Physics Laserplane Jan. 1992.
Philip Greenspun May 1993.

(List continued on next page.)

Primary Examiner—Kevin J. Teska
Assistant Examiner—Dan Fiul
Attorney, Agent, or Firm—Young & Basille

[57] ABSTRACT

An apparatus and method for directing the operations of multiple geography-altering machines on a common work site relative to one another. Position information from several machines is shared to generate a common, dynamically-updated site database showing the machines' relative positions and site progress in real time. The common site database is used to direct the operation of one machine with respect to another machine or machines, for example by generating an operator display of the site showing relative machine position and total machine work on the site. The operator can accordingly adjust the machine's operation to avoid interference with other machines or unnecessary overlap of work on the site. The information can also be used to coordinate the operations of several machines in complementary fashion. Machine position information can be broadcast from the machines to the site database to create a common, dynamically-updated database which is then shared with one or more of the machines. In a particular embodiment each machine is provided with its own dynamically-updated database and operator display, and machine position information is shared on a continuous, real-time basis between the machines so that they effectively share a common site database.

31 Claims, 20 Drawing Sheets

OTHER PUBLICATIONS

Arnex Navigation Systems AB (2 pages).
PCT Search Report.
Super Distance Unmanned Heavy Equipment System (Aug. 1993).
Design News–Waging War On Radioactive Refuse (Oct. 18, 1993).
ILS Today (May 17, 1993) 4 pages.
Techbase (8 pages).
Agtek Advanced Grade Technology (Sep. 15, 1993) 4 pages.
Sextants in Space Can Change the World.
Data Weigh–Introducing Landmap.
Design News – (Aug. 2, 1993).
Real Time Locating for Remote Sensing (Jul. 1993).
Geolink Moves Mapping Into a Whole New Field (1 page).
Rasterware Specifications (May 1993).
Windows of Opportunity–Ascendent (6 pages).
Fortune–Information Technology (Oct. 18, 1993).
Modular Mining Systems (4 pages).
Pulsearch Navigation Systems (4 pages).
International Search Report (3 pages) Jun. 4, 1995.
Article, Sumpter & Asher—GPS Goes Real Time Sep. 7, 1994 pp. 64, 65, 66.
Article, Graber—GPS Applications In Insurance Mines Aug. 13, 1994 pp. 6–11.

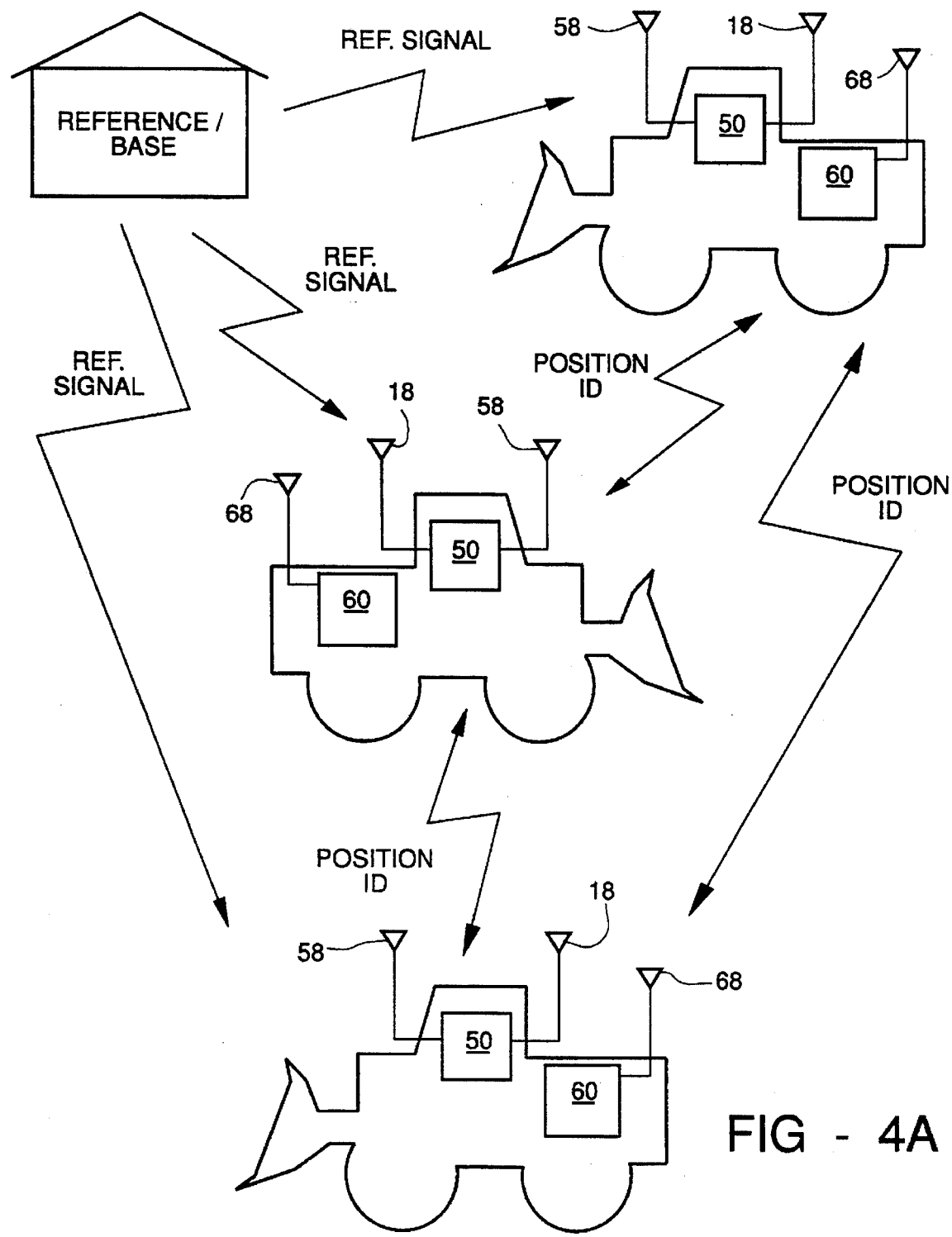
FIG - 4A
FIG - 5
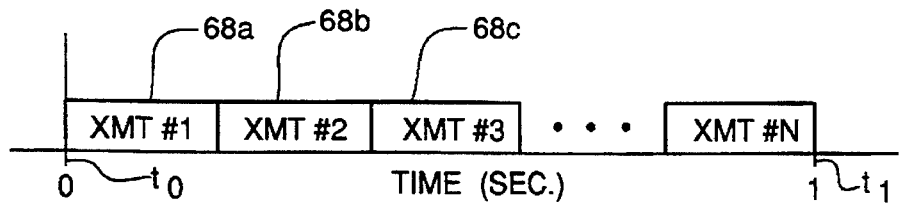

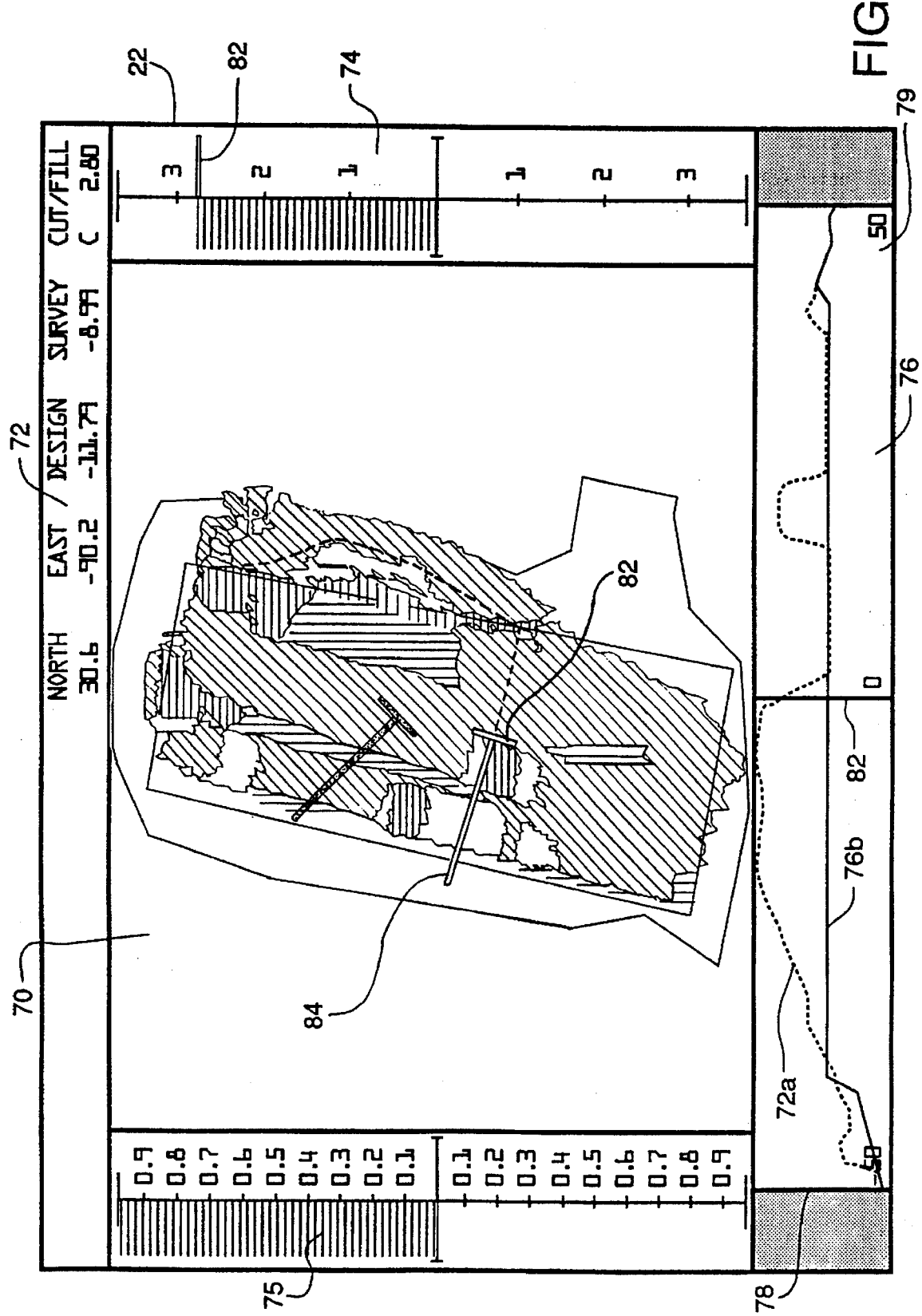

METHOD AND APPARATUS FOR REAL-TIME MONITORING AND COORDINATION OF MULTIPLE GEOGRAPHY ALTERING MACHINES ON A WORK SITE

This is a continuation of application Ser. No. 08/228,837 filed on Apr. 18, 1994, now abandoned.

FIELD OF THE INVENTION

This invention relates to the operation of mobile geography-altering machinery on a work site and, more particularly, to the real time monitoring and coordination of two or more machines as they move over and work on the site through the creation of a common database of real time site update and machine position information.

As used in this patent specification the phrase "geography altering machinery" and various approximations thereof refer to self-propelled mobile machines, for example compactors, track-type tractors, road graders, pavers and asphalt layers, which exhibit both (1) mobility over or through a work site, and (2) the capacity to alter the topography or geography of a work site with a tool or operative portion of the machine such as a compacting wheel, blade, shovel, bucket, ripper or the like.

BACKGROUND OF THE INVENTION

Caterpillar, Inc., the assignee of this invention, has invented real time methods and systems for precisely determining the position of a mobile geography-altering machine as it traverses a work site and for creating a dynamically updated digital model of the site as it is altered by the machine. These systems improve the ability of an operator or site supervisor to monitor and control the operation of a single machine on the work site.

The Caterpillar systems use a digital data storage, retrieval and process facility which may be carried on the machine for storing, creating and modifying a digital model of the site as it exists at any given time, as well as a digital model of the desired geography of the site. They further use a mechanism by which the exact position in three-dimensional space of the machine, or its operative portion, can be accurately determined in real time; i.e., as it traverses and alters the site thereby to update the site model, point by point and in real time. In a preferred implementation a phase differential GPS (global positioning system) receiver system is used which is capable of precisely locating a moving object in three-dimensional space to centimeter accuracy. The digital process facility, e.g. a local computer, includes a dynamic site database and differencing algorithm which compares the desired site model to the continuously updated actual site model and generates signals representing the degree of alteration needed at each of a large number of coordinates over the site to bring the actual model into conformity with the desired model. The signals are used in one practical application to provide real time displays on the machinery to cue the operator as to the machine's actual position and progress in real time and within a frame of reference which conveys information as to at least a substantial portion of the overall site.

The site, or a practically displayable portion thereof, is subdivided into a continuous matrix of unit areas of such size that the machine may traverse these unit areas at a rate which is greater than the sampling rate of the GPS receiver and data processing facility. Algorithms are provided which take into account the physical parameters and dimensions of at least an operative portion of the machine and the relationship thereof to the machine in its path of travel. The unit areas of the display are filled in, colored, revised or otherwise altered in accordance with progress information derived from the GPS receiver and the digital processing facility. The real time path of the machine relative to the site between position readings is determined with a differencing algorithm which determines effective parameters of the operative portion of the machine less than or equal to its actual parameters, and which updates each portion of the site model which the effective parameters traverse.

The present invention provides a solution to the previously unaddressed problem of coordinating multiple geography-altering machines as they operate on a common work site, in particular where the machines are equipped with real time three-dimensional positioning capability and their operations are directed with a dynamically updated site database used to monitor machine position and site progress in real time.

SUMMARY OF THE INVENTION

An apparatus is provided for monitoring and coordinating the operations of multiple mobile geography-altering machines on a work site, the apparatus including a site database for storing a site model representing the geography of the site, a means for generating digital signals representing in real time the instantaneous three-dimensional position of a first machine and a second machine as they traverse and alter the site, means for receiving the signals and for updating the site model in accordance with the signals from the first and second machines, and means for directing the operation of the first machine relative to the second machine in real time as they traverse and alter the site.

The site database can be located remotely from the machines, or on one of the machines. The site database can alternately be located on both the first and second machines.

According to another aspect of the invention, the mechanism for generating position signals asynchronously broadcasts the position signals from each machine to the mechanism for receiving the signals. The asynchronous broadcast means can further broadcast a machine-identification signal with the position signal.

The means for directing the operation of the machine can comprise an operator display, for example a display of the site model and the position of the first and second machines on the site. The operator display can be located remotely from the machines, or on one or more of the machines.

The apparatus of the present invention can further include means for monitoring the operation of the first and second machines relative to one another to prevent interference between them. This can include means for defining a machine interference boundary around a machine to provid a warning signal when the position or boundary of another machine is determined to be within that boundary.

Two mobile geography-altering machines can each be equipped with apparatus to generate signals representing in real time the three-dimensional position of the machine as it traverses and alters the site. Each machine is also provided with digital data storage and retrieval apparatus for storing a site model representing a geography of the site, and a dynamically updated site database for receiving position signals and for updating the site model in accordance with the signals. Each machine is further provided with apparatus for transmitting its position signals to the other machine, and for receiving position signals from the other machine. The site database on each machine is then additionally updated with the position signals from the other machine to create a common site database. Apparatus is provided for directing the operation of each machine relative to the other machine working on the site in accordance with the common site database.

In a further aspect the invention comprises a method of directing the operation of a mobile geography-altering machine on a work site relative to other such machines operating on the site. A site database, including a site model representing the geography of the site, is produced and stored in a digital data storage and retrieval apparatus. Signals representing in real time the instantaneous three-dimensional position of a first machine and a second machine as they traverse the site are generated and used to update the site database to create a common site database. The operation of the first machine can accordingly be directed relative to the second machine using the common site database.

The site database can be located remotely from the machines, or located on one or both of the first and second machines.

In a further embodiment of the inventive method, the position signals of each machine are asynchronously broadcast such that only one machine per unit time broadcasts its position signal to the site database.

A machine-identifying signal can be broadcast with the position signal from each machine. The mixed position/ID signal from a particular machine can be matched with machine parameters to update the site database in accordance with the specific characteristics of that machine.

The step of directing the operation of the first machine relative to the second machine is achieved in one embodiment by providing an operator display of the common site database on at least the first machine. The operator display includes a display of the site model and the position of both the first and second machines relative to the site. The operator display can be located remotely from the machines, or on one or more of the machines.

In a further aspect of the inventive method, the operation of the first and second machines relative to one another is monitored to provide a warning to prevent interference between them when safety or operating parameters are exceeded. In one form a machine interference boundary is defined around a machine and a warning signal is provided when the position or boundary of another machine is determined to be within that boundary. This can be achieved, for example, by providing an operator display of the site model showing the position of the first and second machines on the site model and their respective interference boundaries.

In a preferred form the method of directing the operations of a mobile geography-altering machine on a work site relative to other such machines operating on the work site comprises the steps of equipping two or more mobile geography-altering machines to generate signals representing in real time their instantaneous three-dimensional positions as they traverse the site, providing digital storage and retrieval apparatus on each machine to store a site model representing a geography of the site, and providing a dynamically-updated site database on each machine for receiving the position signals from that machine and for updating the site model in accordance with the position signals. Each machine is further equipped to transmit its position signals to the other machine, and to receive the other machine position signals. The site database on each machine is then additionally updated in accordance with the position signals from the other machine to create a common, dynamically-updated site database. The common site database is then used to direct the operation of each machine relative to the other machine.

An apparatus is also provided for directing the operations of multiple mobile geography-altering machines in three-dimensional space relative to a land site using three-dimensional position signals and a digitized model of the site. A plurality of mobile geography-altering machines are each equipped with apparatus for receiving the position signals and for determining the instantaneous position in three-dimensional space of at least a portion of each machine as it traverses and alters the site. A model of the site geography is stored in a digital data storage facility. A common, dynamically-updated site database communicates with the position determining apparatus of each machine and the digital data storage facility. The site database is equipped to update the site model in the storage facility in real time according to the three-dimensional position of each machine relative to the site.

The invention further includes a method for directing the operation of multiple mobile geography-altering machines in three-dimensional space relative to a common work site using three-dimensional position signals and a digitized model of the site. The method includes the steps of equipping a plurality of the geography-altering machines to receive the position signals and determine their instantaneous positions in three-dimensional space as they traverse and alter the site, storing the site model in a digital data storage facility, and generating a common, dynamically-updated site database by updating the site in real time according to the three-dimensional position of each machine relative to the site.

BRIEF DESCRIPTION OF THE DRAWINGS

FIGS. 4 and 4A are schematic representations of an embodiment of the apparatus of FIG. 3 using GPS positioning and two-way radio communication between multiple machines;

FIG. 5 illustrates an asynchronous machine position broadcasting method;

FIG. 8 is an alternate operator display which can be generated for an earth contouring application of the present invention.

BEST MODE FOR CARRYING OUT THE INVENTION

Figure 1:
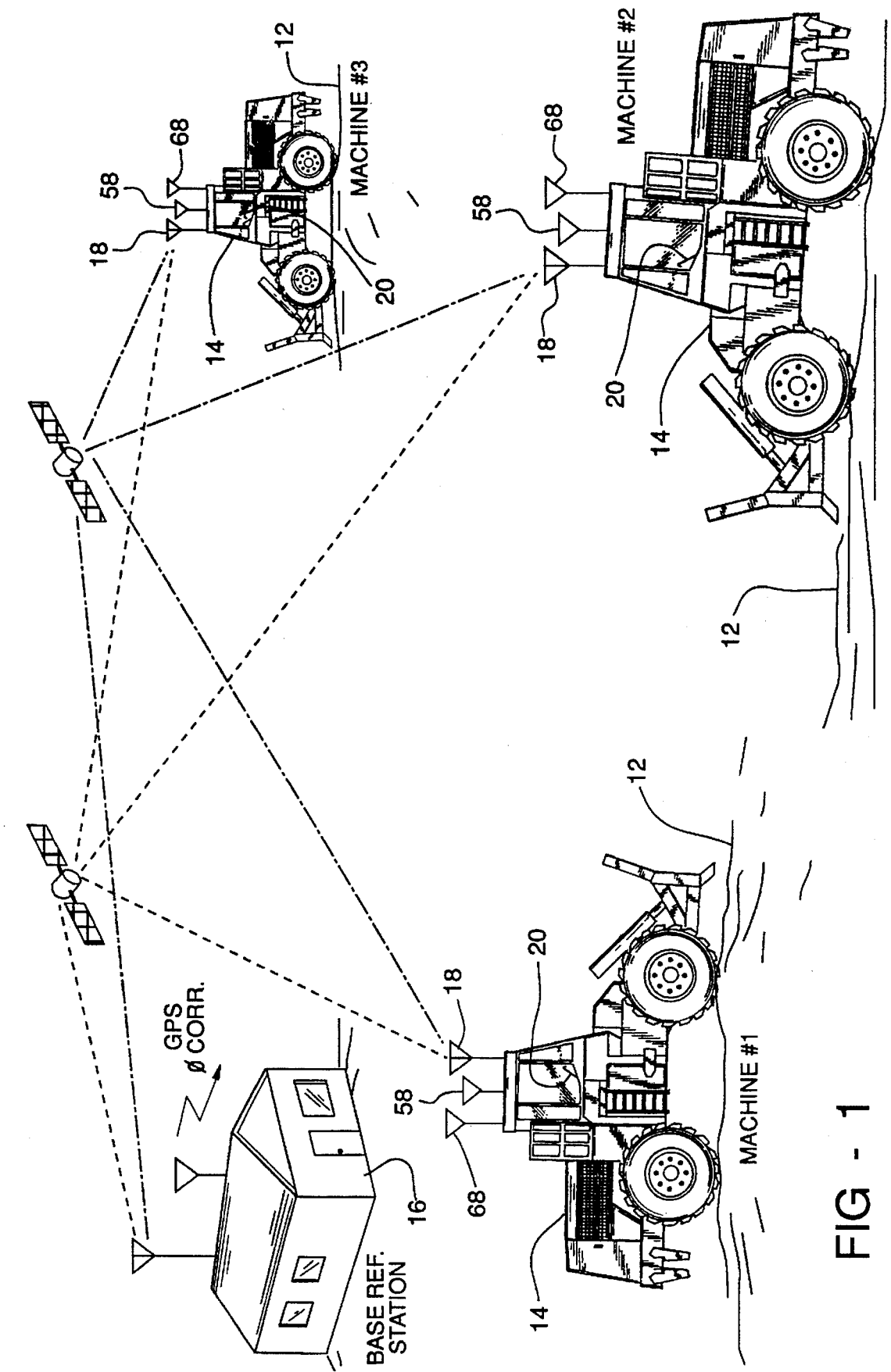
FIG. 1 is a schematic perspective view of a compacting work site with a base reference station and multiple compacting machines operating on the site.

Referring to FIG. 1, a landfill compacting site 12 is schematically illustrated with a number of landfill compacting machines 14 of a known type operating over the site surface to compact it. In the illustrated embodiment each machine 14 is equipped with a three-dimensional positioning system and a dynamically updated site database for geography-altering operations. The site database includes a digitized site model, for example a two- or three-dimensional topographical map of the site surface subdivided into a number of unit areas in known manner. As the machine positioning system determines and signals the position of machine 14 traversing site 12 in real time, the site database is dynamically updated to reflect the machine position relative to the site and corresponding changes in the site topography, for example by noting elevation changes where the topography is raised or lowered by the operation of the machine, or by incrementing a pass count comprising the number of passes by a machine over a unit area of the site. The dynamic database generates signals representing machine position and the updated site model, which signals can be used to direct the operation of the machine, for example with a real time operator display and/or automatic machine controls.

In the illustrated embodiment the machines 14 are equipped with 3-D position information apparatus 18 using kinematic GPS positioning. Primary position signals are received at 18 from the GPS satellite constellation orbiting the Earth and a differential/correction signal is received at 58 from base reference station 16. Information on kinematic GPS positioning and a system suitable for use with the present invention can be found, for example, in U.S. Pat. No. 4,812,991 issued Mar. 14, 1989 and U.S. Pat. No. 4,963,889 issued Oct. 16, 1990, both to Hatch. Other 3-D positioning systems are known and can be used, however, for example 3-D laser positioning, GPS/laser combinations, or UHF/VHF radio.

Using kinematic GPS or other suitable three-dimensional position signals from an external reference, the location of receiver 18 and each machine 14 can be accurately determined on a point-by-point basis within a few centimeters as the machines traverse site 12. The sampling rate for coordinate points using the illustrative positioning system is approximately one point per second.

Accordingly, as each machine 14 traverses site 12 and performs its compacting operations, the operator of each machine is provided with accurate, real time machine position and site update information for that machine. Although the illustrated embodiment shows a landfill compacting operation, real time machine position and site update systems for geography-altering operations such as earth moving/contouring, grading, paving and the like are within the scope of the invention.

The present invention addresses the need for coordinating the movement and work of multiple machines 14 working on the same site 12. This is achieved by creating a common, dynamically-updated site database reflecting the real time position and site progress of multiple machines operating on the site, and using that common database to give a machine operator or supervisor accurate, coordinated, real time machine position and site update information for every machine operating on the site.

Real time machine position information is "shared" by each machine with the common database via suitable transceiver apparatus 68. The site database can then be used to direct the operations of as many machines as desired relative to one another. For example, each machine can be provided with its own individual site database in an on-board computer 20, that database continuously updated with its own position information and position information from every other machine, such that each database is essentially identical to that of every other machine at any point in time. Alternately, a single database, located on one machine or adjacent the site at base 16, can receive position information from each machine, update the site database locally, and transmit signals to each machine to direct their operation, for example for generating an operator display of the dynamically updated site model on each machine.

Figure 2:
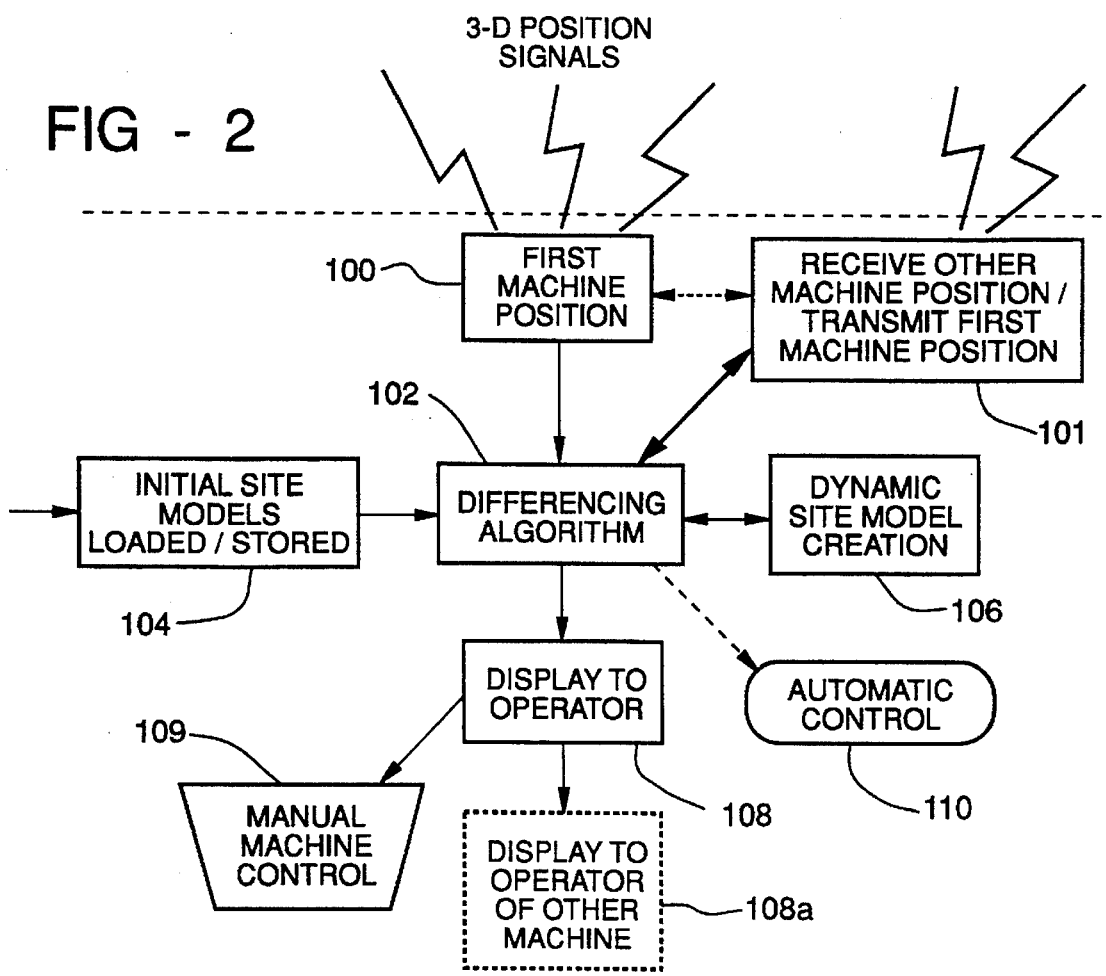
FIG. 2 is a schematic representation of a multiple machine coordination method according to the present invention.

Referring now to FIG. 2, the method of the present invention is shown schematically. Using a known three-dimensional positioning system with an external reference, for example (but not limited to) 3-D laser, GPS, GPS/laser combinations or UHF/VHF radio, machine position coordinates are determined in block 100 as the machine moves over the site. These coordinates are instantaneously supplied as a series of discrete points to a differencing algorithm at 102. The differencing algorithm calculates the machine position and path in real time. Digitized models of the actual and desired site topography/geography are loaded or stored at block 104, an accessible digital storage and retrieval facility, for example a local digital computer. The differencing algorithm 102 retrieves, manipulates and updates the site models from 104 and generates at 106 a dynamic site database of the difference between the actual site and the desired site model, updating the actual site model in real-time as new position information is received from block 100. This dynamically updated site model is then made available to the operator in display step 108, providing real time machine position and site updates in human readable form. Using the information from the display the operator can efficiently monitor and direct the manual control of the compacting machine at 109.

Additionally, or alternately, the dynamic update information can be provided to an automatic machine control system at 110, for example an electrohydraulic control system of the type developed by Caterpillar Inc. and used to operate pumps, valves, hydraulic cylinders, motor/steering mechanisms and other controls used in geography-altering machinery. The electrohydraulic controls can provide an operator assist to minimize machine work and limit the manual controls if the operator's proposed action would, for example, overload the machine. Alternately, the site update information from the dynamic database can be used to provide fully automatic control of one or more machine operating systems.

For the exemplary compaction embodiment illustrated below, the desired site model is a predetermined desired degree of compaction of material on the site surface. The actual site model is the actual degree of compaction of the site material, ranging between an uncompacted state and the desired degree of compaction. When the machine traverses the site in a compacting operation, the actual site model is monitored and updated in real time at 106 as the machine brings the actual site into conformity with the desired site model. For other site operations, for example earth contouring using a blade-equipped tractor, the actual and desired site models may comprise the actual and desired surface contours of the site; the difference between them at any coordinate point is the difference in elevation at that point. It will be understood that various site models for different site operations can be used with the present invention. Information on site modeling is commercially available.

Still referring to FIG. 2, the method of the present invention provides for the real time "sharing" of machine position information among multiple machines on the site, such that the machines effectively share a common site database of the position of each machine and the site alterations made by each machine. As a result, an unprecedented level of coordination and cooperation between multiple machines working on a single site can be achieved. For example, the operator(s) of the machines can monitor the relative proximity of machines to avoid unsafe conditions, and undesirable overlap of machine operations can be reduced or eliminated. Machine operations on the site can also be coordinated in a complementary manner, for example by directing several machines to perform successive operations on a portion of the site and updating the site database accordingly.

This is achieved in the method of FIG. 2 at block 101 where machine position information, for example 3-D coordinate points in an (x, y, z) coordinate system, is received from a second machine by a suitable data transmission link. The multiple machine position information from blocks 100 and 101 is delivered to block 102, where the differencing algorithm calculates the position and path of both machines in real time and updates the site database at 106 accordingly. The resulting database displayed to the operator at 108 shows the positions of both machines on the site as well as the alterations to the site made by each machine.

Additionally, the position information received for the first machine at block 100 can be retrieved from block 102 and transmitted at block 101 to an identical dynamic database being used to direct the operations of the second machine. The dynamic database for the second machine is accordingly updated with position information from both the first and second machines as described above, and the resulting database displayed to the operator of the second machine. In this manner the two machines effectively share a common, dynamically updated site database.

While the embodiment of FIG. 2 illustrates a method where the first and second machines receive site update information from separate, commonly-updated site databases, it is possible to omit the transmission of machine position information at block 101 to another database. Instead, the dynamic site updates generated by the database at 106 can be shared directly with the second machine, for example by transmitting signals to generate an operator display on the second machine as shown in phantom at 108a.

And, while the method of FIG. 2 is illustrated for coordinating two machines, it will be apparent that the number of machines which can be coordinated using this method is limited only by the rate at which the machine position information from each machine can be received and processed to update the dynamic database(s). For example, at block 101 machine position information could be received from and transmitted to a third machine, a fourth machine, a fifth machine, and so on.

In the illustrated method of FIG. 2 the position information for the second machine received at block 101 is input directly to the differencing algorithm at 102, and the position information for the first machine is retrieved from the differencing algorithm at 102. However, it is possible to input position information from the second machine directly to a system position computer at 100 for subsequent delivery to the differencing algorithm at 102, and to receive position information for the first machine directly from block 100 for transmission to the second machine.

Figure 3:
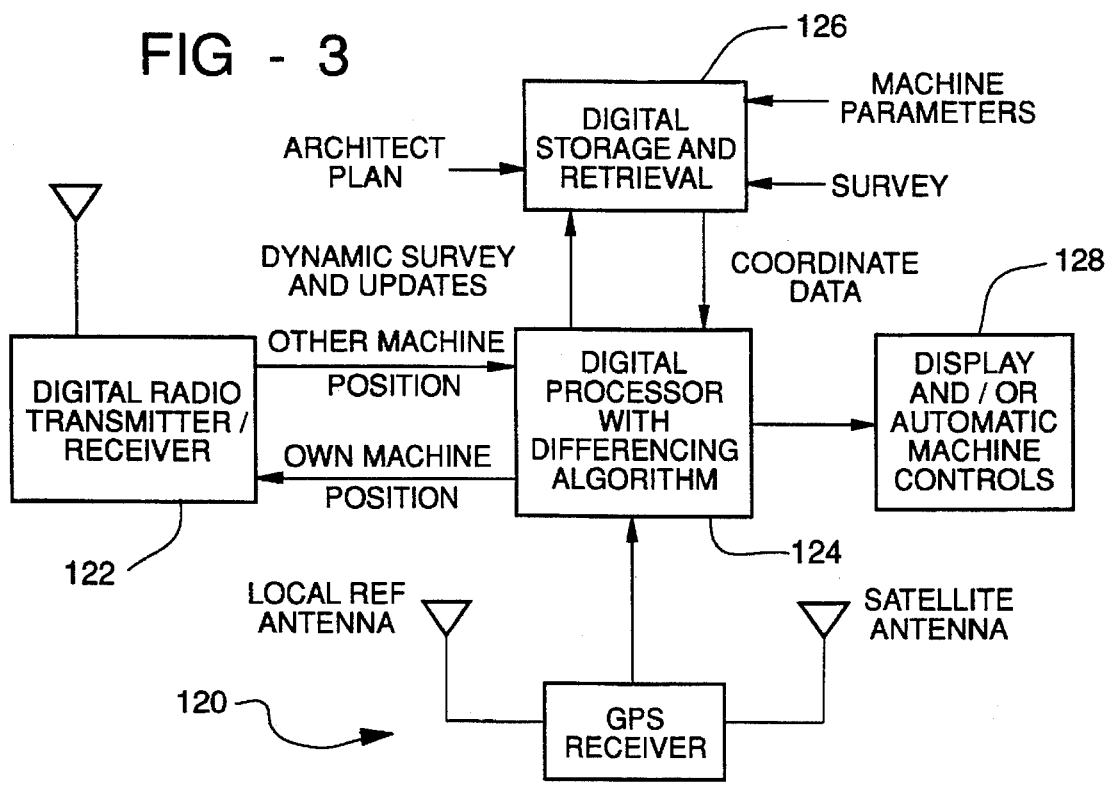
FIG. 3 is a schematic representation of an apparatus which can be used in connection with the receipt and processing of GPS and machine position/ID signals to carry out the present invention.

Referring now to FIG. 3, an apparatus which can be used in connection with the receipt and processing of GPS signals to carry out the present invention is shown in block diagram form comprising a GPS receiver apparatus 120 with a local reference antenna and a satellite antenna for generating position information for a first machine; a digital radio transmitter/receiver 122 for receiving position information from other machines; a digital processor 124 employing a differencing algorithm, and connected to receive position information from 120 and 122; a digital storage and retrieval facility 126 accessed and updated by processor 124, and an operator display and/or automatic machine controls at 128 receiving signals from processor 124.

GPS receiver system 120 includes a satellite antenna receiving signals from global positioning satellites, and a local reference antenna. The GPS receiver system 120 uses position signals from the satellite antenna and phase differential correction signals from the local reference antenna to generate position coordinate data in three-dimensions to centimeter accuracy for moving objects. Alternatively, raw data from the reference antenna can be transmitted to processor 124, where the differential correction can be locally determined.

This position information is supplied to digital processor 124 on a real-time basis as the coordinate sampling rate of the GPS receiver 120 permits. The digital storage facility 126 stores a desired site model, for example a desired degree of compaction of the site according to a predetermined compaction standard, and a second site model, in an illustrative compacting operation the actual degree of compaction of the site, for example uncompacted as initially surveyed. The actual site model can be accessed and updated in real time by digital processor 124 as it receives new position information from GPS receiver 120.

Digital processor 124 further generates signals representing the difference between the continuously-updated actual site model and the desired site model. These signals are provided to the operator display and/or automatic machine controls at 128 to direct the operation of the machine over the site to bring the updated actual site model into conformity with the desired site model. The operator display at 128, for example, provides one or more visual representations of the difference between the actual site model and the desired site model to guide the operator in running the machine for the necessary operations.

To generate a common site database useful for coordinating multiple machines, the apparatus of FIG. 3 is provided at 122 with a two-way digital radio capable of receiving position information from other GPS-equipped machines and providing it to the digital processor 124, and transmitting the position coordinates from the GPS receiver system 120 for a first machine. Digital processor 124 uses the position information received by radio 122 in the same manner as the position information received from GPS system 120 to update the site database. Accordingly, the operator display at 128 will show the site position of each machine for which position information is available, as well as visual representations of the difference between the actual site model and the desired site model as determined or updated by each machine.

Where multiple machines are operating on a site, particularly where the machines are of a different type or size, it is desirable to encode a machine-unique ID signal with the position information from each machine. The ID signal is preferably stored in the database on each machine. The digital processor 124 can then identify each machine from which particular position information is being received. Where the machines differ in operating parameters or type, machine parameters corresponding to the machine-unique ID signal can be stored in digital storage and retrieval apparatus 126. The machine parameters are retrieved by the digital processor 124 and matched with an incoming position/ID signal to distinguish the machine on the operator display, to more accurately determine the path of a particular machine and the changes it may have made to the site, and its position.

Figure 4:
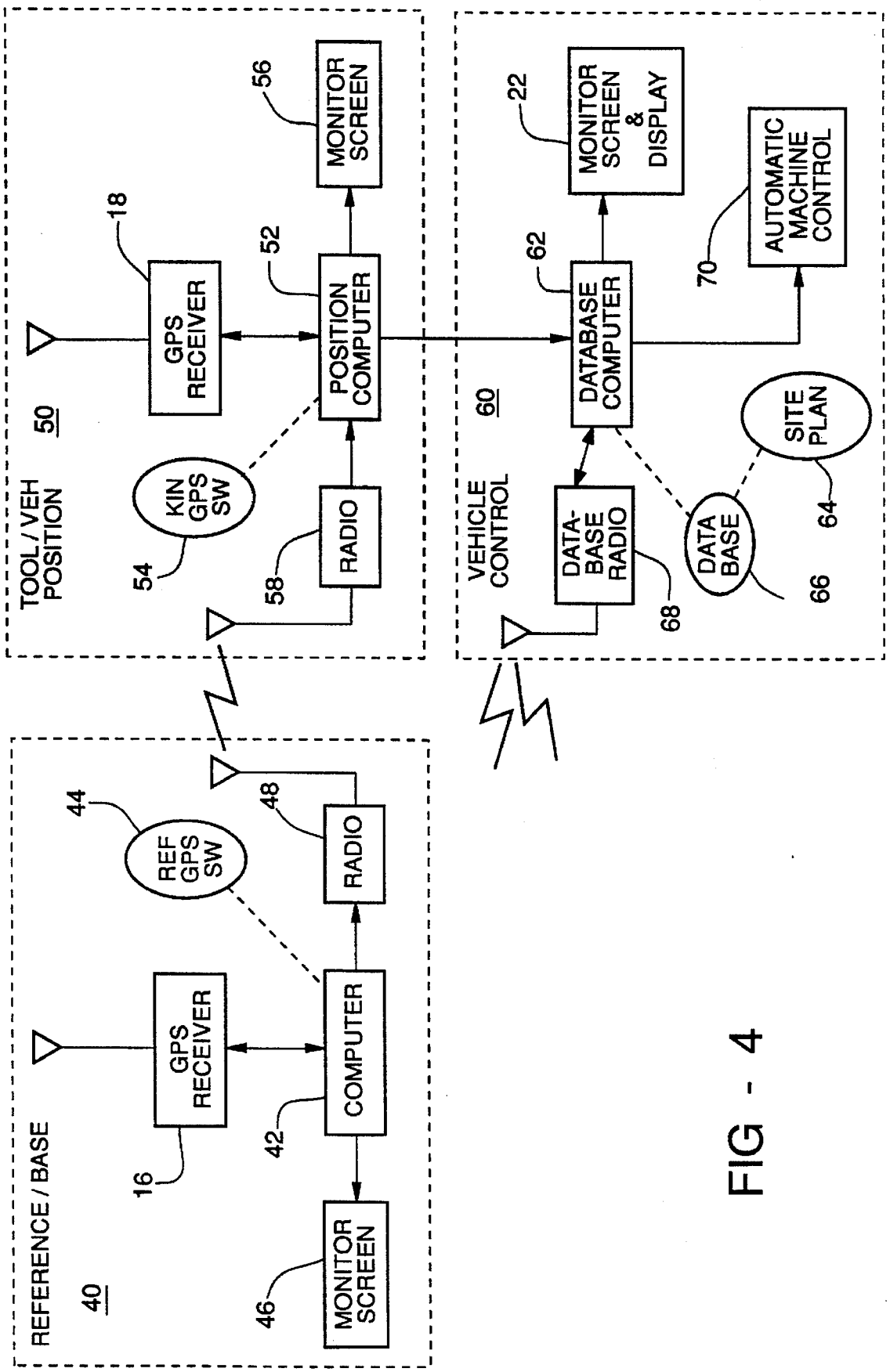

Referring now to FIG. 4, a more detailed schematic of a system according to FIG. 3 is shown using kinematic GPS for position reference signals. A base reference module 40 and a position module 50 together determine the three-dimensional coordinates of a compacting machine relative to the site, while an update/control module 60 converts this position information into real time representations of the site which can be used to accurately monitor and control the machine.

Base reference module 40 includes a stationary GPS receiver 16; a computer 42 receiving input from receiver 16; reference receiver GPS software 44, temporarily or permanently stored in the computer 42; a standard computer monitor screen 46; and a digital transceiver-type radio 48 connected to the computer and capable of transmitting a digital data stream. In the illustrative embodiment base reference receiver 16 is a high accuracy kinematic GPS receiver; computer 42 for example is a 486DX computer with a hard drive, 8 megabyte RAM, two serial communication ports, a printer port, an external monitor port, and an external keyboard port; monitor screen 46 is a passive matrix color LCD; and radio 48 is a commercially available digital data transceiver.

Position module 50 comprises a matching kinematic GPS receiver 18, a matching computer 52 receiving input from receiver 18, kinematic GPS software 54 stored permanently or temporarily in computer 52, a standard computer monitor screen 56, and a matching transceiver-type digital radio 58 which receives signals from radio 48 in base reference module 40. In the illustrative embodiment position module 50 is located on a compacting machine to move with it over the work site.

Update/control module 60, also carried on board the compacting machine in the illustrated embodiment, includes an additional computer 62 receiving input from position module 50; one or more site models 64 digitally stored or loaded into the computer memory; a dynamic database update module 66, also stored or loaded into the memory of computer 62; and a color operator display screen 22 connected to the computer. Instead of, or in addition to, operator display 22, automatic machine controls 70 can be connected to the computer to receive signals which operate the machine in an automatic or semi-automatic manner in known fashion.

In FIG. 4 module 60 further includes a transceiver-type digital radio 68, for example a low level spread spectrum radio, communicating with database computer 62 to supply it with position information received in broadcasts from other machines (not shown). Radio 68 is also capable of transmitting the position information from its own machine position module 50, received through computer 62, to the other machines.

Although update/control module 60 is here shown mounted on the geography-altering machine, some or all portions may be stationed remotely. For example, computer 62, site model(s) 64, and dynamic database 66 and radio 68 could be connected by radio data link to position module 50 and operator display 22 or machine control interface 70. Position and site update information can then be broadcast to and from the machine for display or use by operators or supervisors both on and off the machine.

Base reference station 40 is fixed at a point of known three-dimensional coordinates relative to the work site. Through receiver 16 base reference station 40 receives position information from a GPS satellite constellation, using the reference GPS software 44 to derive an instantaneous error quantity or correction factor in known manner. This correction factor is broadcast from base station 40 to position station 50 on the compacting machine via radio link 48,58. Alternatively, raw data can be transmitted from base station 40 to position station 50 via radio link 48,58, and processed by computer 52.

Machine-mounted receiver 18 receives position information from the satellite constellation, while the kinematic GPS software 54 combines the signal from receiver 18 and the correction factor from base reference 40 to determine the position of receiver 18 and the geography-altering machine relative to base reference 40 and the work site within a few centimeters. This position information is three-dimensional (e.g., easting, nording and elevation) and is available on a point-by-point basis according to the sampling rate of the GPS system.

Referring to update/control module 60, once the digitized plans or models of the site have been loaded into computer 62, dynamic database 66 generates signals representative of the difference between the actual and desired site models to display this difference graphically on operator display screen 22 relative to the site topography. Using the position information received from position module 50, the database 66 also generates a graphic icon of the geography-altering machine superimposed on the site topography on display 22 corresponding to the actual position and direction of the machine on the site.

Because the sampling rate of the position module 50 results in a time/distance delay between position coordinate points as the compacting machine moves over the site, the dynamic database 66 of the present invention uses a differencing algorithm to determine and update in real-time the path of the machine.

With the knowledge of the geography-altering machine's exact position relative to the site, the difference between the actual and desired site models, and the machine's progress relative thereto, the operator can maneuver the compacting machine over the site to alter it without having to rely on intuitive feel, memory or physical site markers. And, as the operator moves the machine over the site the dynamic database 66 continues to read and manipulate incoming position information from module 50 to dynamically update both the machine's position relative to the site, the path of the machine over the site, and any change to the site (e.g., topography, degree of compaction) effected by the machine's passage. This updated information is used to generate representations of the site and can be used to direct the operation of the geography-altering machine in real time to bring the actual, updated site model into conformity with the desired site model.

To coordinate the operations of multiple machines on the site with a common, dynamically-updated database, database radio 68 receives position information from other machines on the site which are provided with their own position modules 50 and their own counterparts to radio 68 for broadcasting their position information. Database computer 62 accordingly receives position information from every machine on the site so equipped. Dynamic database 66 is updated in real time with the position of every machine relative to the site, the path of every machine over the site, and any change in the site effected or determined by each machine. The operator is then provided with a display at 22 showing the position and work progress of each machine, and can coordinate their activities accordingly.

INDUSTRIAL APPLICABILITY

Referring to FIG. 4A, an illustrative application of the invention is shown schematically in which three compacting machines 14, each provided with a position module 50 and control module 60 as shown in FIG. 4, are operating on a common site. The position module 50 on each machine determines that machine's position using reference signals from base reference module 40 and a GPS satellite constellation. The position information from each module 50 on each machine is delivered to its control module 60 for dynamic updating of the site database. Additionally, a combined position/ID signal from the digital radio 68 associated with each control module 60 is transmitted to a matching radio 68 on the other machines, such that the dynamic database on each machine is provided with position information corresponding to every machine on the site. The operator of each machine accordingly knows the exact position of both his own machine and the other machines, and can adjust his operations accordingly. In this manner each machine effectively shares a common, dynamically-updated database, since each database is updated with the same position information in a nearly simultaneous fashion.

Referring now to FIG. 5 a method for transmitting the position information between machines is illustrated. Digital radio 68 in the illustrated embodiment is a low power spread spectrum radio capable of making a general broadcast of a combined position/ID signal to the other machines on the site. To prevent interference between the position/ID signals from the different machines as they are received and processed by the dynamic database, each digital radio 68 is assigned a time slot in which to broadcast its signal, such that one machine broadcasts while all others receive. In the illustrated embodiment the time slots are synchronized with the GPS sampling rate of one coordinate point per second.

In the schematic chart of FIG. 5, the one second time interval between a first GPS sample coordinate $t_0$ ($x_0$, $y_0$, $z_0$) and a second GPS sample coordinate $t_1$ ($x_1$, $y_1$, $z_1$) is divided into at least three broadcast time slots 68a, 68b, and 68c corresponding to each compacting machine 14 illustrated in FIG. 4A. At time slot 68a a first machine transmits its position information from sample coordinate time $t_0$ to the other machines; at broadcast time slot 68b a second machine transmits its position information determined at sample coordinate $t_0$; at broadcast time slot 68c the third machine transmits its position information at sample coordinate time $t_0$ while the other two receive. In this fashion machine position/ID signals can be traded in the interval between GPS coordinate samples without interference and in a manner enabling database computer 62 to update the site database one machine at a time. The number of machines which can share information to generate a common, dynamically-updated site database is accordingly limited only by the speed at which position information can be determined in module 50, transmitted by radio 68, and processed by computer 62.

It will be understood that the invention is not limited to a spread spectrum radio or any particular data transmission link. Virtually any wireless broadcast and receiver system can be used to share the machine position information necessary to generate a common site database for several machines.

Referring now to FIGS. 6 and 7A–7I, a further application of the present invention is illustrated for a landfill compacting operation.

In machine compacting, for example of landfills, earth, or freshly laid asphalt, the completion of the compacting operation is typically a function of the number of passes of the compactor over the surface to be compacted. The desired degree of compaction can be determined, for example, by running a compactor over a test area of uncompacted material and empirically determining a suitable pass-count standard. By way of illustrative example, in a landfill compacting operation it is desirable that a machine such as a large, heavy compactor with studded rollers or wheels pass over a portion of the landfill to compress new refuse to some predetermined degree in accordance with local compaction regulations or sound compacting practices. It is therefore important for the operator of the compactor to know: whether he has been over a given unit area or grid element of the landfill site; how many times the compactor has been over a given grid element on the site; the extent to which the material has been successfully compacted within a grid element on the site; and, whether uncompacted material has been added to a particular grid element since the last compacting pass.

Systems and software are currently available to produce digitized, two- or three-dimensional maps of a geographic or topographic site. For example, a topographic blueprint can be converted into a three-dimensional digitized model of the initially surveyed topography as shown at 36 in FIG. 6A and of a subsequent site topography, for example after a landfill has been filled in or the original site contour is altered, as shown at 38 in FIG. 6B. The site contours can be overlaid with a reference grid of uniform grid elements 37 in known fashion. Digitized site plans can be superimposed, viewed in two or three dimensions from various angles (e.g., plan or profile), and color coded to designate areas in which the site needs to be altered from the actual state to the desired state.

Figure 6A:
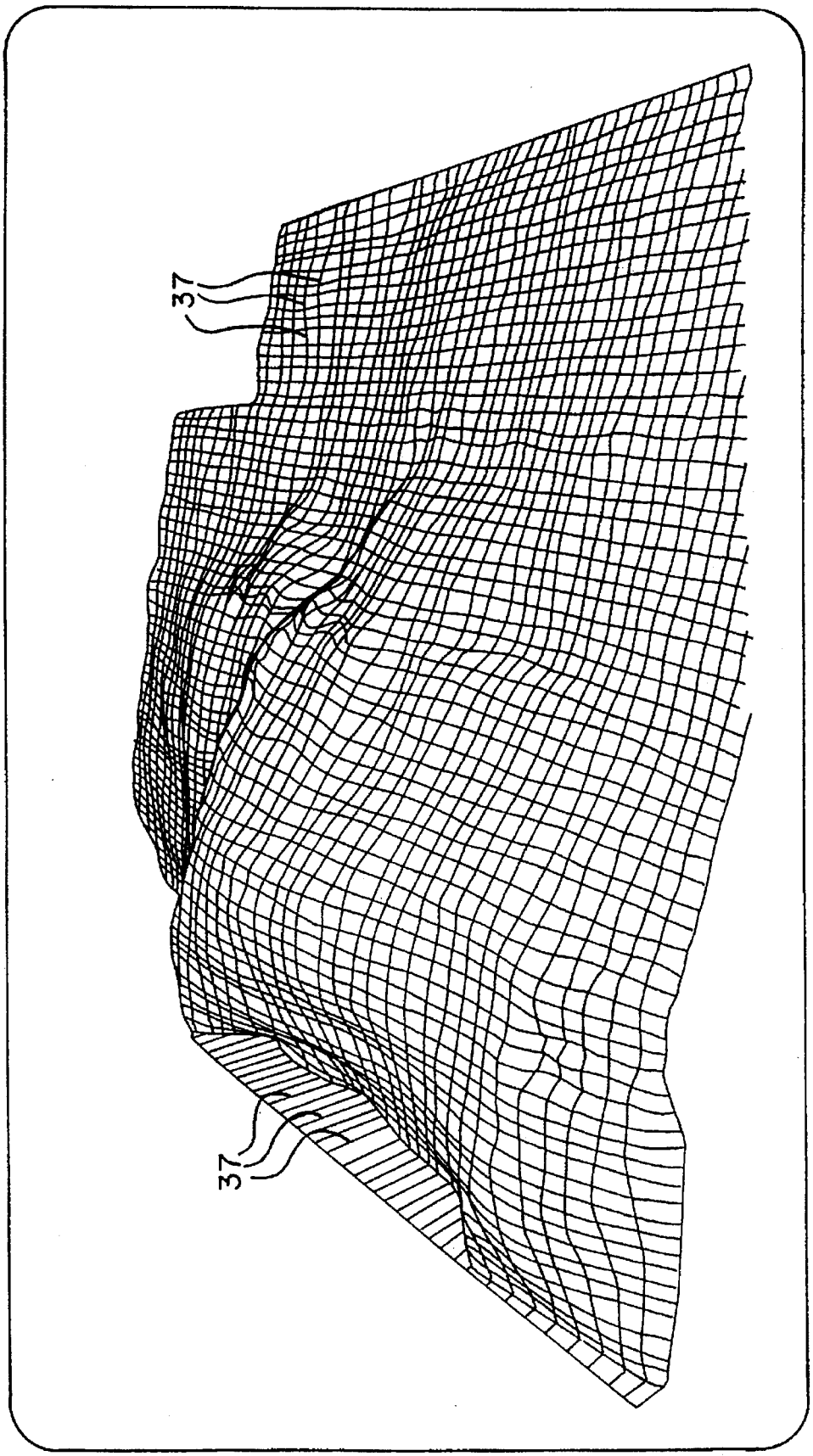
FIGS. 6A and 6B are illustrative three-dimensional computer models of a site which can be used with the present invention.

At the start of the compacting operation, the actual site model may initially comprise a three-dimensional survey or map of the site topography in an uncompacted state, for example a digitized three-dimensional site model as shown in FIG. 6A. As compacting operations progress, the actual site model more specifically comprises the actual degree of compaction of the material on the surface of the site, as measured for example by compaction pass count and/or elevation change. The actual site model is dynamic in that it changes each time new material is added or old material is further compacted from its previous state.

The desired site model comprises a predetermined, desired degree of compaction for material on the surface of the site. For example, where the desired degree of compaction is predetermined to be a total of five passes of the compactor over a previously uncompacted area, the desired site model is a pass count of five passes over a previously uncompacted area. When that pass count is reached, the desired site model is achieved. The difference between the actual and desired site models at any point on the site comprises the difference between the actual degree of compaction and the desired degree of compaction at that point.

The actual site model accordingly fluctuates between an uncompacted state of the site material and the desired degree of compaction. Whenever new, uncompacted material is detected in a previously compacted area of the site, the actual site model returns or decrements to an uncompacted state for that area.

Using the method and apparatus of the present invention, all of this information previously available for a single machine can be determined and updated in real time for multiple machines to generate a common, dynamically updated database.

Figure 6:
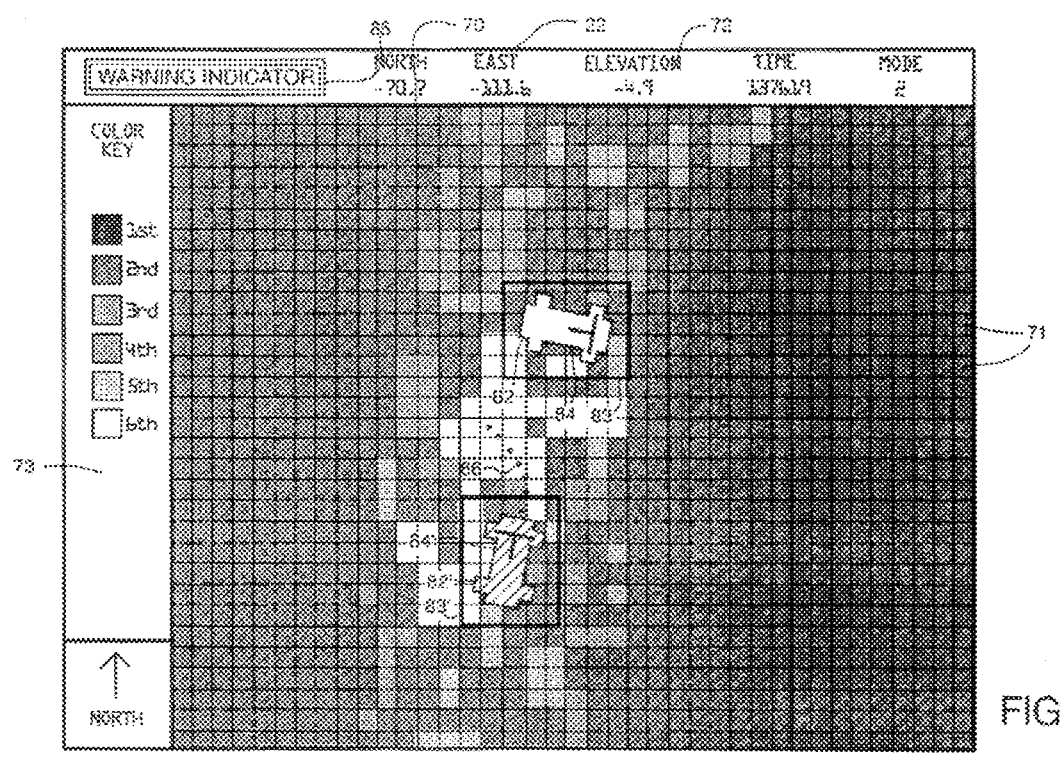
FIG. 6 is a representative operator display generated by the system of the present invention for a landfill compacting operation.
Figure 6B:
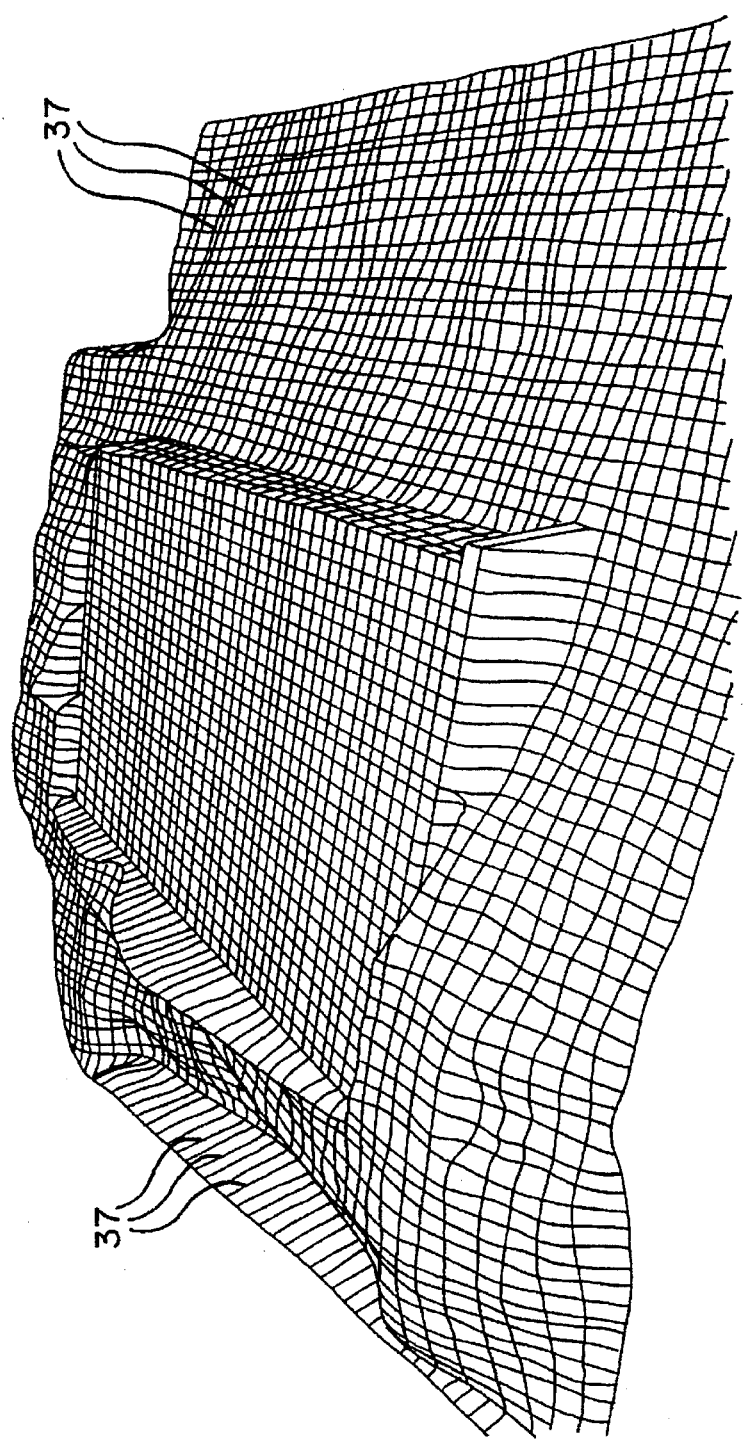

FIG. 6 shows a sample operator display 22 for a compacting operation according to the present invention. Using a digitized model of the landfill site with a superimposed set of grid elements, and two compactors equipped with position modules 50 and update/control modules 60 as in FIGS. 4 and 4A, the operator first initializes the operator display 22, typically upon entering the landfill site. In landfill compacting the probable activity field for a day is typically small, on the order of a few hundred or thousand square meters. For purposes of illustration in FIG. 6 the site database is arbitrarily set at approximately 30 meters by 40 meters. This can be varied depending on the nature of the particular compacting operation. This is smaller than the total area of a typical landfill, but for a single day the compactor operators need a database only for the portion of the landfill in which they will be operating.

In the illustrated embodiment the site is divided into a grid of square elements of fixed area, e.g., one square meter.

The operators initialize their displays and are presented on their respective screens 22 with a site database in plan window 70 such as that shown in FIG. 6, marked off in a grid pattern of elements 71 initially all one color; e.g., black to indicate that no passes have yet been made over that site. A position coordinate window 72 displays the associated compactor's current position in latitude, longitude, elevation and time. A window 73 displays a color key for the compaction status of grid elements 71 displayed and updated in plan window 70; in FIG. 6 the various colors or shadings represent a pass count. The position of each compactor is represented by an icon 82,82' with direction indicator 84,84'.

With the exchange of position information between the position modules 60 on the compactors as described in FIGS. 4 and 4A above, the operator display 22 on each machine shows the real time positions of each compactor relative to the site as illustrated in FIG. 6.

As a further feature of the present invention, each compactor icon 82,82' on display screen 22 is provided with a peripheral spacing or boundary icon, in FIG. 6 a boundary box 83, to maintain a safe margin between the machines as they operate on the site. For example, if the position or boundary icon 83 of one compactor should be determined to touch or overlap that of another compactor on screen 22, the database provides a warning to the operators, for example a visual or audible signal via an indicator or buzzer/beeper associated with screen 22 shown schematically in FIG. 6 at 85. The machine operators can then adjust their operations to avoid work interference or collision.

The size of boundary box 83 for each machine can be varied relative to the machine depending on the machine's mode of operation. For example, where the machine is operating in a slower mode with a correspondingly greater amount of time to correct for potential interference between machines, the boundary defined around the machine is set at a first smaller size. When the machine operates in a faster mode, the boundary can be set at a correspondingly greater size to allow sufficient reaction time once a warning is given. Alternately, multiple layers of boundaries 83 can be employed, each generating a successively more urgent warning as they are violated by the position or boundary of another machine. It will be understood by those skilled in the art that operating parameters other than machine speed can be used as the basis for determining and setting an appropriate boundary around each machine monitored in this fashion.

Each compactor icon 82,82' on screen 22 is visually distinct so that the operator knows which represents his own machine, and which represents the other machine or machines. Although in the illustrated embodiment of FIG. 6 the difference is shown by cross-hatching, on an actual display different colors can be used. For different types of machines other visual distinctions are possible, for example different shapes or outlines.

Prior to the beginning of work on the site, a compaction standard (here a pass count) is set to denote the desired degree of compaction of the site. For example, it may be determined that five passes of the compactor over uncompacted material on any one grid element are necessary for that grid element to be adequately compacted. As the compactors traverse the site, each pass of the compactor wheels over a grid element will result in a database update in real-time. The grid elements of the site display can be visually updated in a variety of ways to show the difference between the actual and desired degree of compaction, e.g., shading, cross-hatching, coloring or "painting" (where a color display is used), or in any other known manner to provide an indicator to the operators of the compaction status of the grid elements. In the illustrated embodiment of FIG. 6, using a color monitor, the grid changes color to denote the actual degree of compaction in terms of how many passes have been made; e.g., the darkest to lightest shading of grid elements 71 represent black for no passes, yellow for one pass, green for two passes, red for three passes, blue for four passes, and white indicating satisfactory compaction at five passes. The objective is to make the entire screen white as the operator display is updated in real-time to indicate the number of passes over each grid element.

Since the dynamically updated database of the present invention is provided with real time position information for both compacting machines 82,82', the site model in the site database is updated with the topography or compaction changes effected by each machine. As shown in FIG. 6, the operator accordingly has real time information on the position of each machine operating on the site, and the collective site update information indicating the total work of the machines on the site. Operators can accordingly avoid machine interference or unnecessary overlap of work on the site. Or, they can more effectively coordinate their efforts in altering the site from the actual state to the desired state.

As an additional aid to the machine operators, the approximate paths of the compactor as measured by coordinate samples can be shown on display 22, in FIG. 6 denoted by a series of dots 86 where each position reading was taken.

It is necessary to provide some protocol for determining when a sufficient portion of a grid element has been passed over by a compactor wheel to warrant a status update for that grid element and register a compacting pass on the operator display. For the illustrated compactors with two or more spaced compacting wheels, the following illustrative method can be used. The size of each grid element on the digitized site plan is preferably matched to the width of a compacting wheel; e.g., for one meter wide wheels the grid elements should be set to one square meter. Accordingly, if the center of the wheel crosses a grid element at any point, it is assumed that at least one half of the grid element has been compacted and can be updated on the display. These dimensions and margins can be varied as desired, however.

The coordinates of the ground-contacting surfaces ("footprints") of the fixed rear compactor wheels are known relative to the position receiver on the compactor. Each coordinate sampling by the positioning system can accordingly be used to determine the precise location of the center of each wheel at that point. In the illustrated embodiment the positions of the footprints of the rear compactor wheels are tracked.

For site operations other than compacting, it will be understood that the position of virtually any portion of the geography-altering machine can be determined relative to the position receiver on the machine, such that each coordinate sampling by the positioning system can be used to determine the precise location of that portion of the machine. For example, in an earth-contouring operation using a tractor equipped with a dozer blade, the position of the tracks or the blade can be determined based on their position relative to the position receiver on the tractor. If possible, it is desirable to place the position receiver close to or on the operative portion of the machine. In a compacting operation the position receiver(s) might preferably be located directly over one or more of the compacting wheels. For earth contouring with a blade-equipped tractor, the position receiver can be mounted directly on the blade. If the portion of the machine being tracked via the position receiver is one which is not always in contact with the site, it may be desirable to provide a sensor of known type on the operative portion to indicate when it is contacting the site surface and actually altering the geography/topography.

In the illustrated compacting embodiment, the time lag between coordinate samplings as the compactor wheels travel over several grid elements must also be taken into consideration to accurately determine the entire real-time path of each compactor. In a compactor with compacting wheels whose width approximates the width of the site model grid elements, a preferred method shown in the illustrated embodiment of the present invention uses the well-known Bresenham's algorithm to produce a continuous line approximating the path of each compactor wheel over the grid elements between coordinate samplings. Then, if the sampling rate only provides a coordinate "point" every three or four grid elements, a line approximation is made of the compactor wheel paths over those three or four grid elements (corresponding to the center of the wheels), and every grid element along that line is given a status update and visual change on the operator display.

Other techniques for measuring the paths of the machines as they traverse the site are known and may be used, depending on the characteristics of the machines, the work, and/or the site. For the illustrative landfill compacting example, the Bresenham's line approximation of the wheel paths is useful.

Referring now to FIGS. 7A–7I, particularly 7A and 7H–7I, the method of the present invention as applied to a landfill compacting application is schematically shown for receiving position information from at least two machines to create a dynamically updated common database. At step 500 in FIG. 7A the operator starts from the computer operating system. At step 502 database memory is allocated and initialized. At step 503 operating parameters for each machine which affect the manner in which their paths or progress is tracked by the database algorithms are initialized, for example in a machine parameter library. At step 504 the various displays are initialized. In step 506 the serial communications between the site database and positioning modules 50 on first and second compactors are initialized.

For purposes of illustration it will be assumed that one serial port is from a first or "home" compactor on which a position module 50 and control module 60 are located as shown in FIG. 4, while the second serial port delivers position information received by a database radio 68 from another machine's position module 50 broadcast via digital radio link as described above. However, it will be readily understood that the method illustrated in FIGS. 7A–7I is suitable for a fixed, off-machine database receiving both position inputs by wireless broadcast.

At step 508 the system determines whether there has been an operator request to terminate the program, for example from a user interface device such as a computer keyboard. This option is available to the operator at any time, and if the system determines that such a request to terminate has been received, it proceeds to step 592 and stores the current site database in a file on a suitable memory device, for example a disk. At steps 594,596 the operator is returned to the computer operating system.

If, however, the system determines at step 508 that there has not been a request to terminate the program, it proceeds to step 510 where a position coordinate is read from the first serial port connection between the first compactor's position module 50 and update/control module 60 of FIG. 4, in the illustrated embodiment a three-dimensional GPS-determined coordinate point. At step 511 a second position coordinate is read from the second serial port connection delivering the position information from the second compactor's timed broadcast. At step 512 the position of the first or "home" compactor 14 is displayed (FIG. 6) in window 72 on operator display screen 22 as three-dimensional coordinates relative to base reference 16.

Figure 7A:
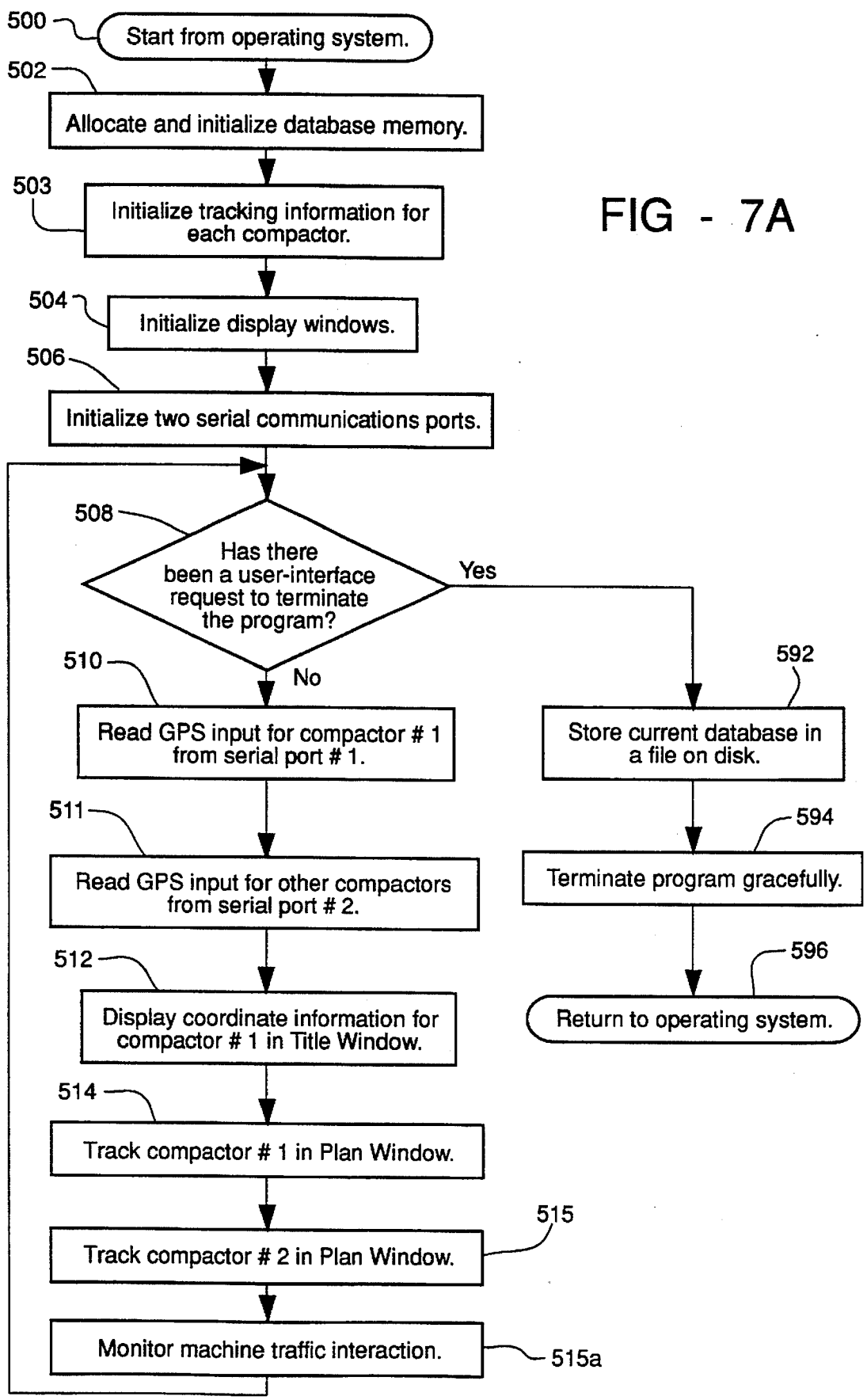
FIGS. 7A–7K are flowchart representations of a dynamic site database with multiple machine coordination for a landfill compacting operation according to the present invention.
Figure 7B:
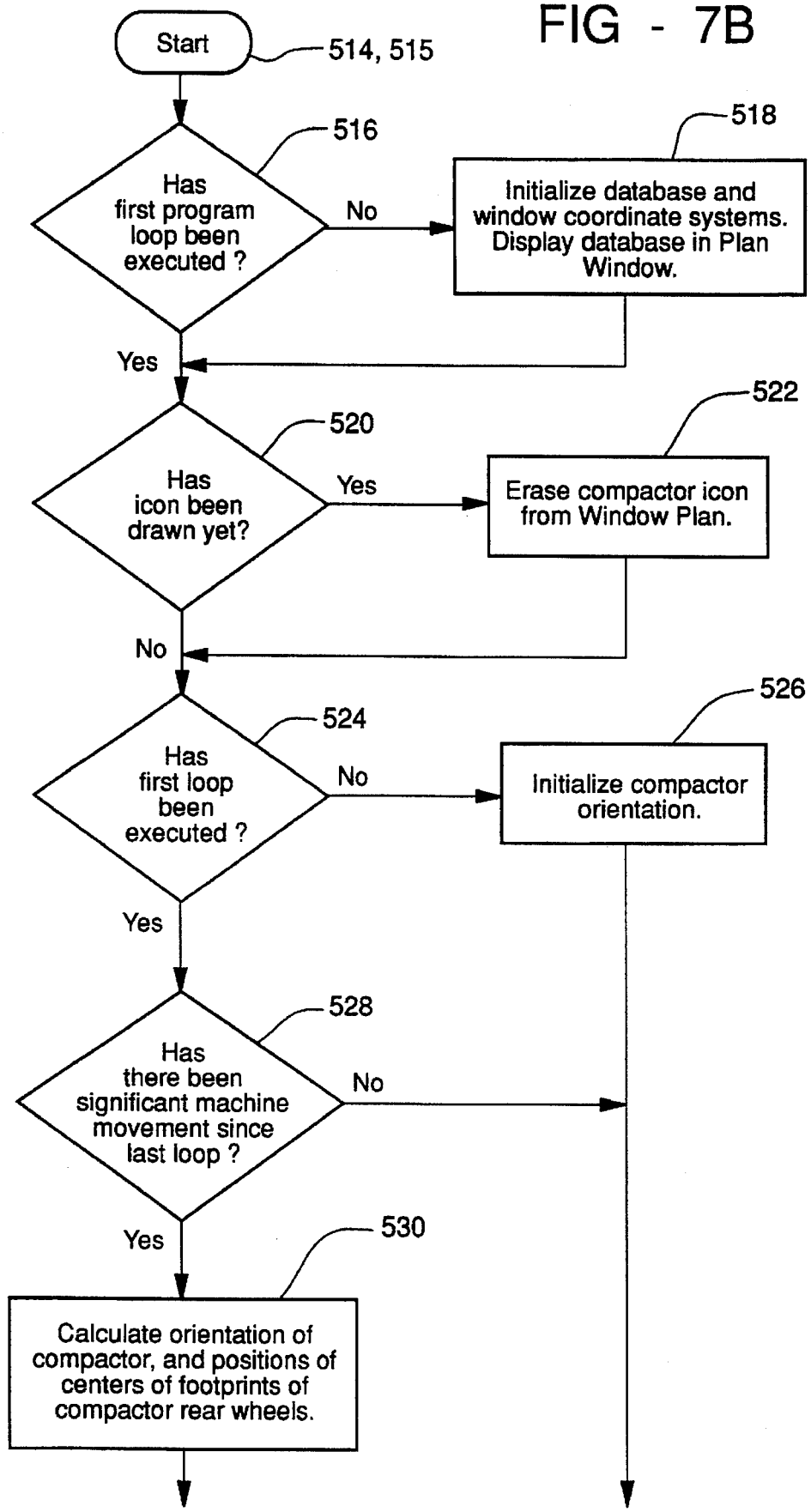
Figure 7C:
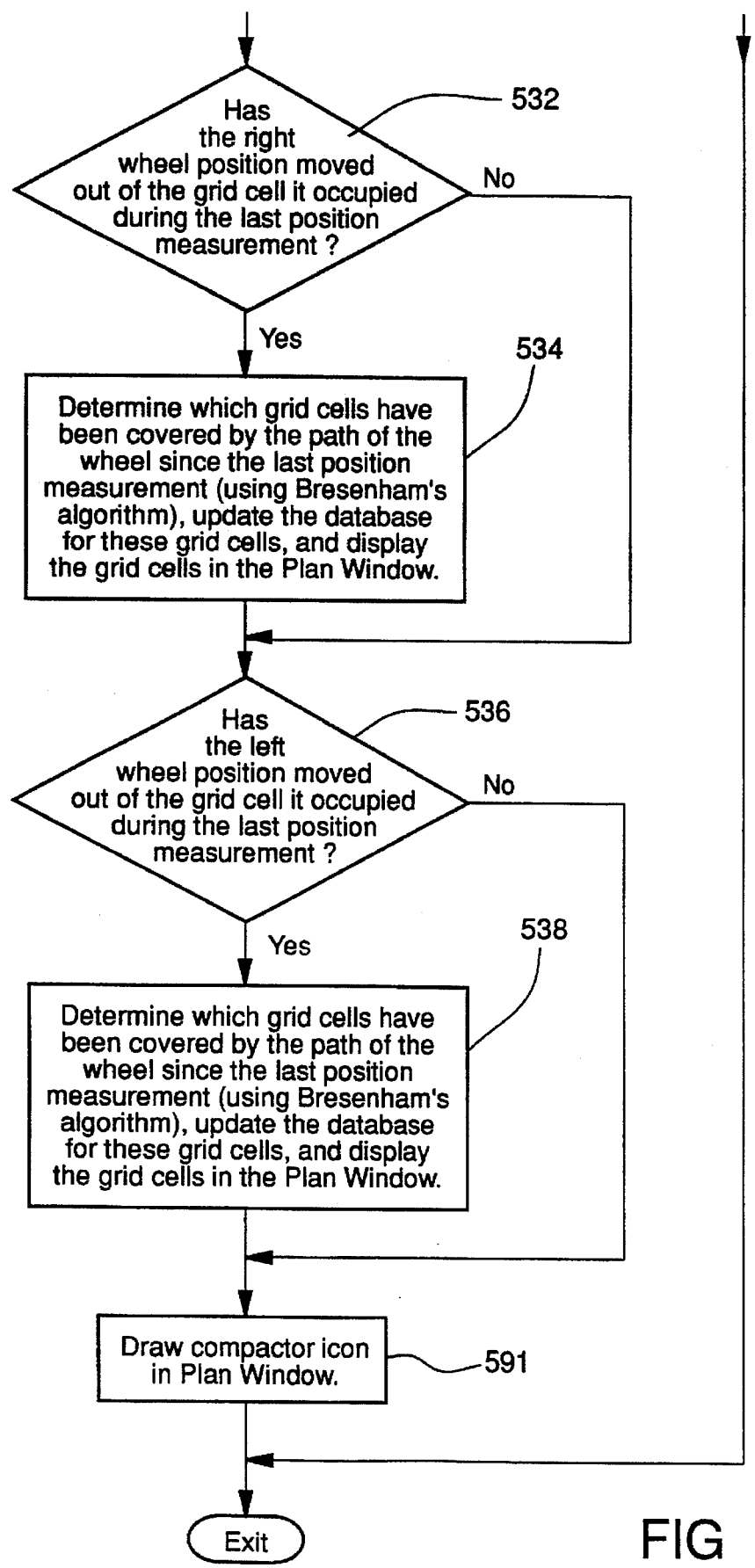

In steps 514,515 a subroutine shown in FIGS. 7B–7C draws the display and icons based on the position information from each compactor. The subroutine determines the orientation of the compactor and the position of the centers of the "footprints" or ground-contacting portions of the rear compactor wheels, tracks the path of the rear compactor wheels over the site database, and updates the compaction status of the grid elements in the path of the compactor. The subroutine runs successively for each compactor in the order its position information is received at steps 510,511.

Referring to FIG. 7B, at step 516 the system determines whether the first program loop has been executed. If not, the site database and display window coordinate systems are initialized and displayed on operator screen 22 at step 518. After the first program loop has been executed and the site database initialized and displayed on the operator screen, the system at step 520 checks whether the appropriate icon 82 or 82' has already been drawn. If yes, that icon is erased from the display at step 522. If the icon for that compactor has not yet been drawn, at step 524 the system determines whether the first loop has been executed; if not, the orientation of the compactor is initialized at step 526 and the system completes the overall program loop of FIG. 7A. If at step 524 the system determines that the first loop has already been executed, the system proceeds in FIG. 7B to step 528 to determine whether the compactor has moved since the last program loop. If the machine has not moved, the system exits the subroutine of FIG. 7B and returns to complete the overall program loop of FIG. 7A from step 514.

If the machine has moved relative to the site database since the last loop, the system proceeds to step 530 in FIG. 7B to calculate the positions of the centers of the footprints of the rear compactor wheels, and from those the orientation of the compactor. At step 532 in FIG. 7C the system determines whether the right rear compactor wheel position has moved out of the grid element it occupied during the last position measurement. If it has, at step 534 the path of the right wheel between the previous and current coordinate samplings is determined using the well-known Bresenham's algorithm to approximate a continuous line path of the right wheel over the grid elements on the display 22. The grid elements of the site database over which the right wheel has passed are then updated to indicate a compaction pass, and grid elements are updated on the visual display window 70 with a color change or other visual indicator.

If at step 532 the right wheel has not moved since the last position measurement, or after the movement of the right wheel has been tracked and the site database updated at step 534, the process is repeated for the left wheel of the compactor at steps 536,538. At step 591 the updated compactor icon is then redrawn on the display to show its current position and direction. The subroutine of step 514 in FIG. 7A is then completed for the first compactor. If position information has been received from the second compactor, the subroutine illustrated in FIGS. 7B and 7C is repeated for the second compactor at step 515.

When steps 514,515 have been completed for each compactor the system proceeds to step 515a where the interaction between machines on the site is monitored, and appropriate warning given if operating safety margins are exceeded, according to a subroutine described below in FIG. 7I. The system then returns to repeat the program loop of FIG. 7A, either proceeding to step 510 for more GPS coordinate samplings, or terminating in response to an operator request.

Figure 7D:
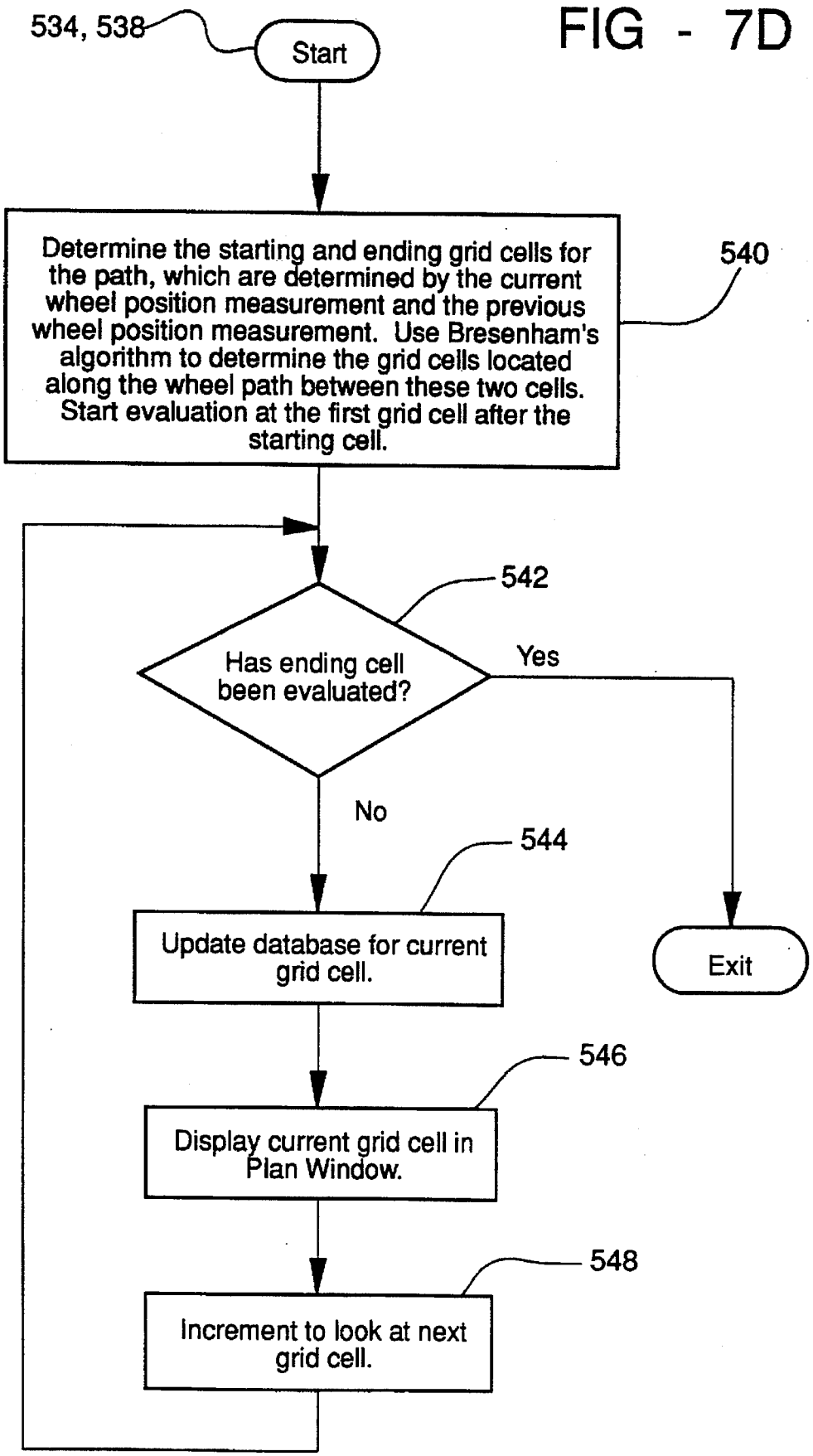

In FIG. 7D a subroutine for the wheel tracking and site updating operations of steps 534 and 538 is shown. At step 540 the starting and ending grid cells for the wheel whose path is being determined are defined by the current wheel position measurement and the previous wheel position measurement taken by the GPS or other positioning system. The Bresenham's algorithm is applied to determine the grid cells located along the path between the starting and ending grid cells, and the system proceeds to steps 544,546,548 to evaluate/update the status of each grid element therebetween, beginning with the first grid element after the starting grid element. At step 542 the system determines whether the ending grid element has been evaluated; if not, it proceeds to step 544 where the grid element being evaluated is updated according to a subroutine in FIG. 7G. Once the compaction status of the current grid element has been updated at step 544, the updated grid element is displayed on the operator screen 22 at step 546, and at step 548 the system is incremented to evaluate the next grid element in the path between the starting and ending grid elements. This loop repeats itself until the ending grid element has been evaluated and updated, at which point the subroutine of FIG. 7D is exited and the program returns to step 591 in FIG. 7C to draw the updated compactor icon on the display.

Figure 7E:
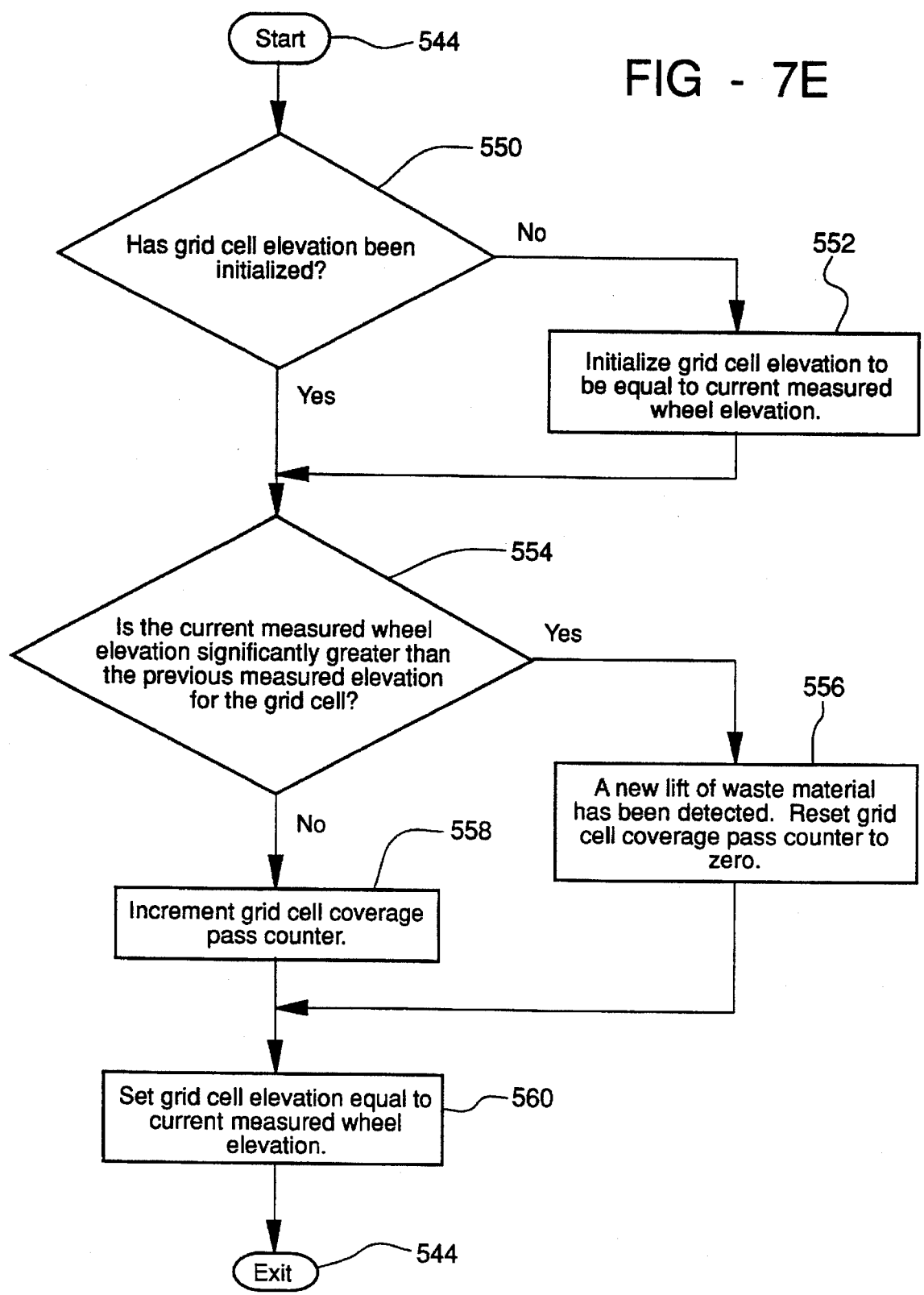
Figure 7F:
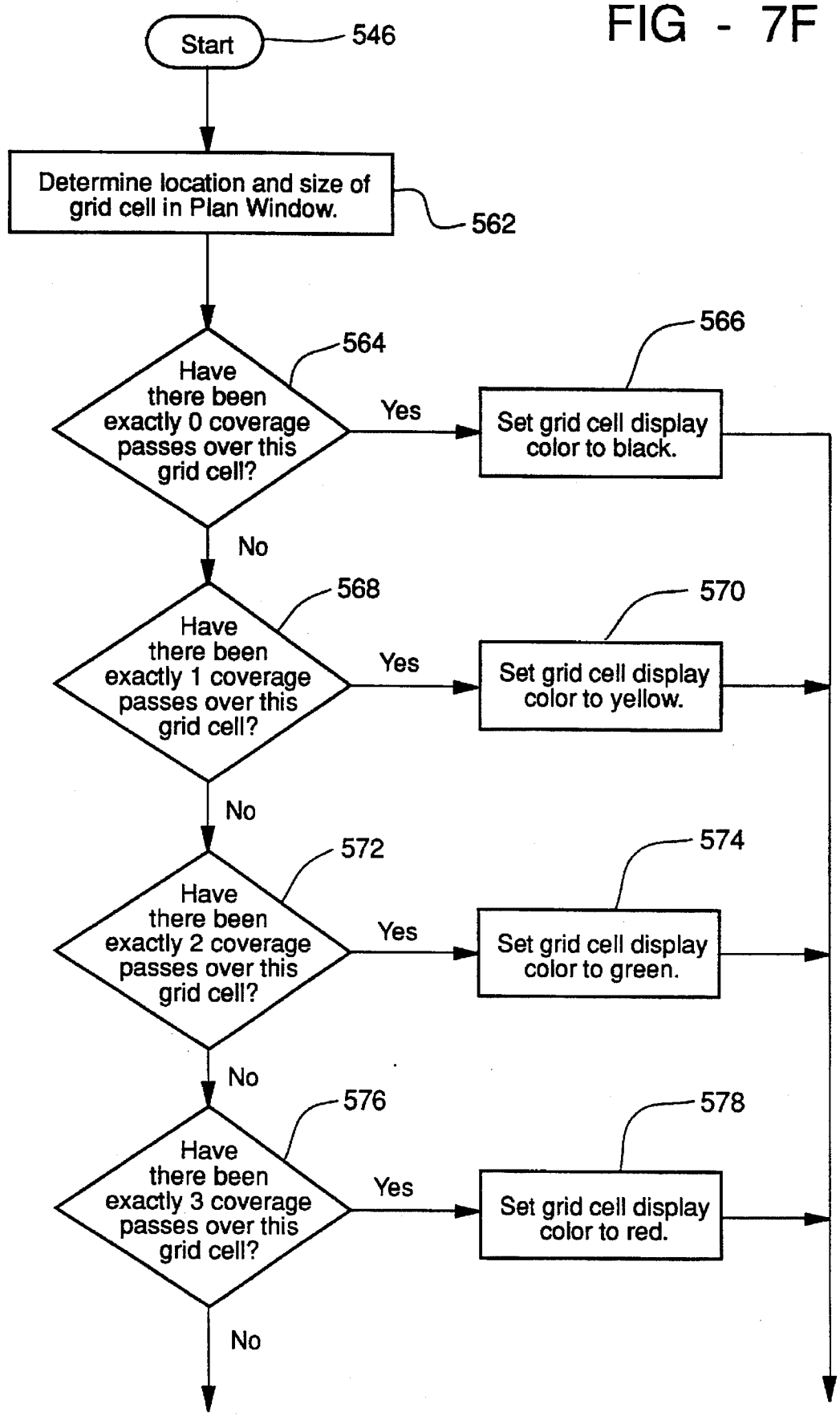
Figure 7G:
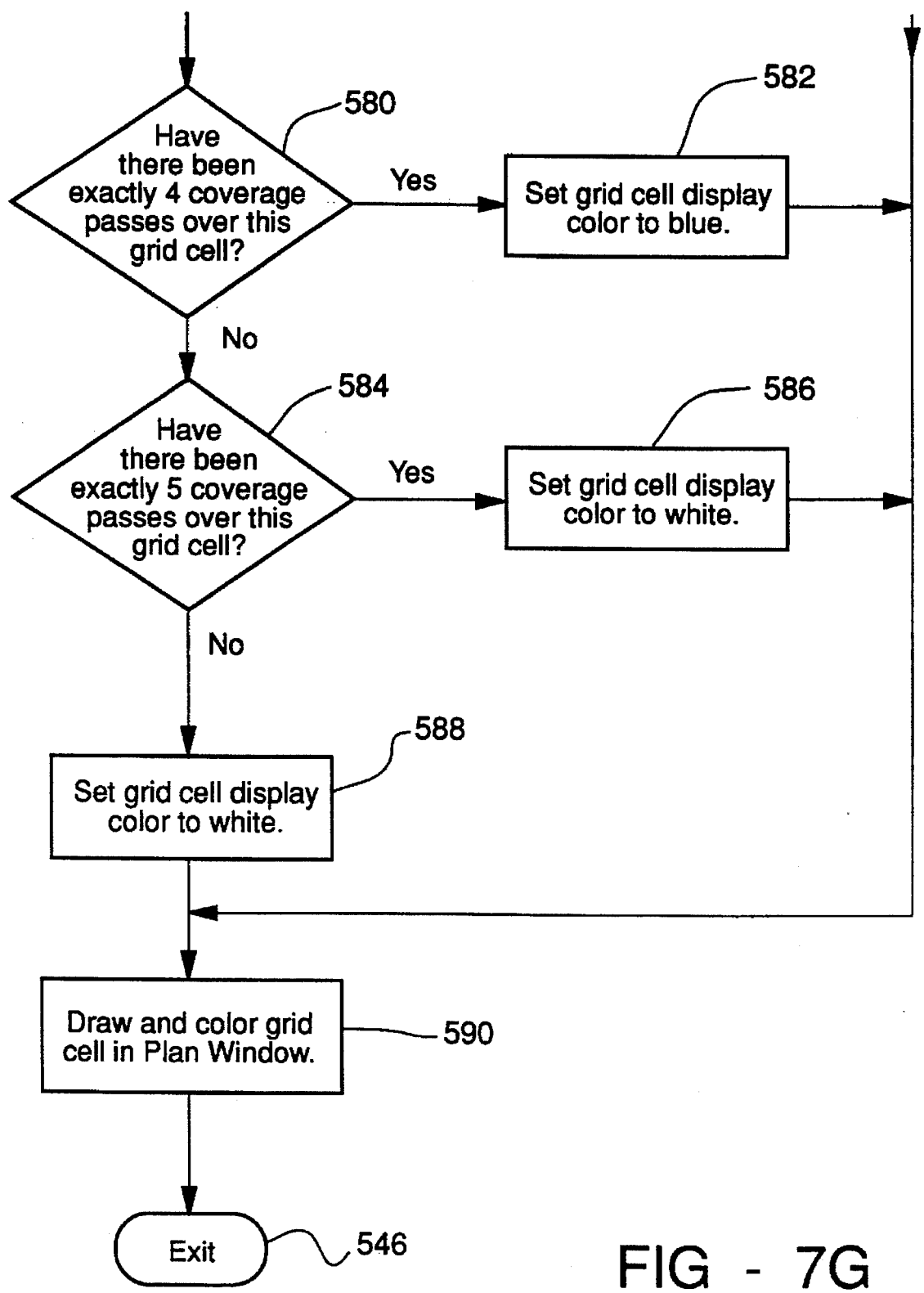
Figure 7H:
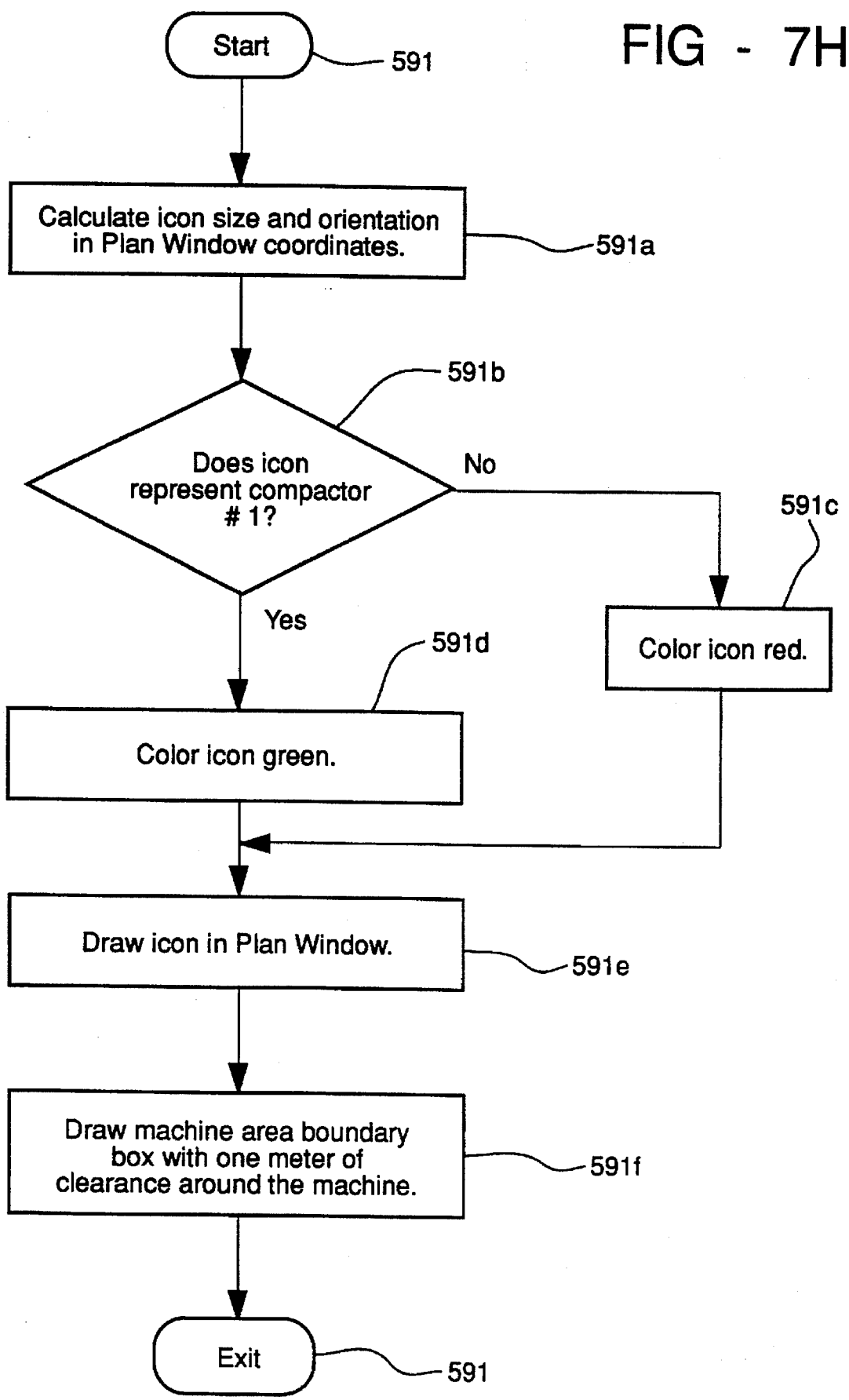
Figure 7L:
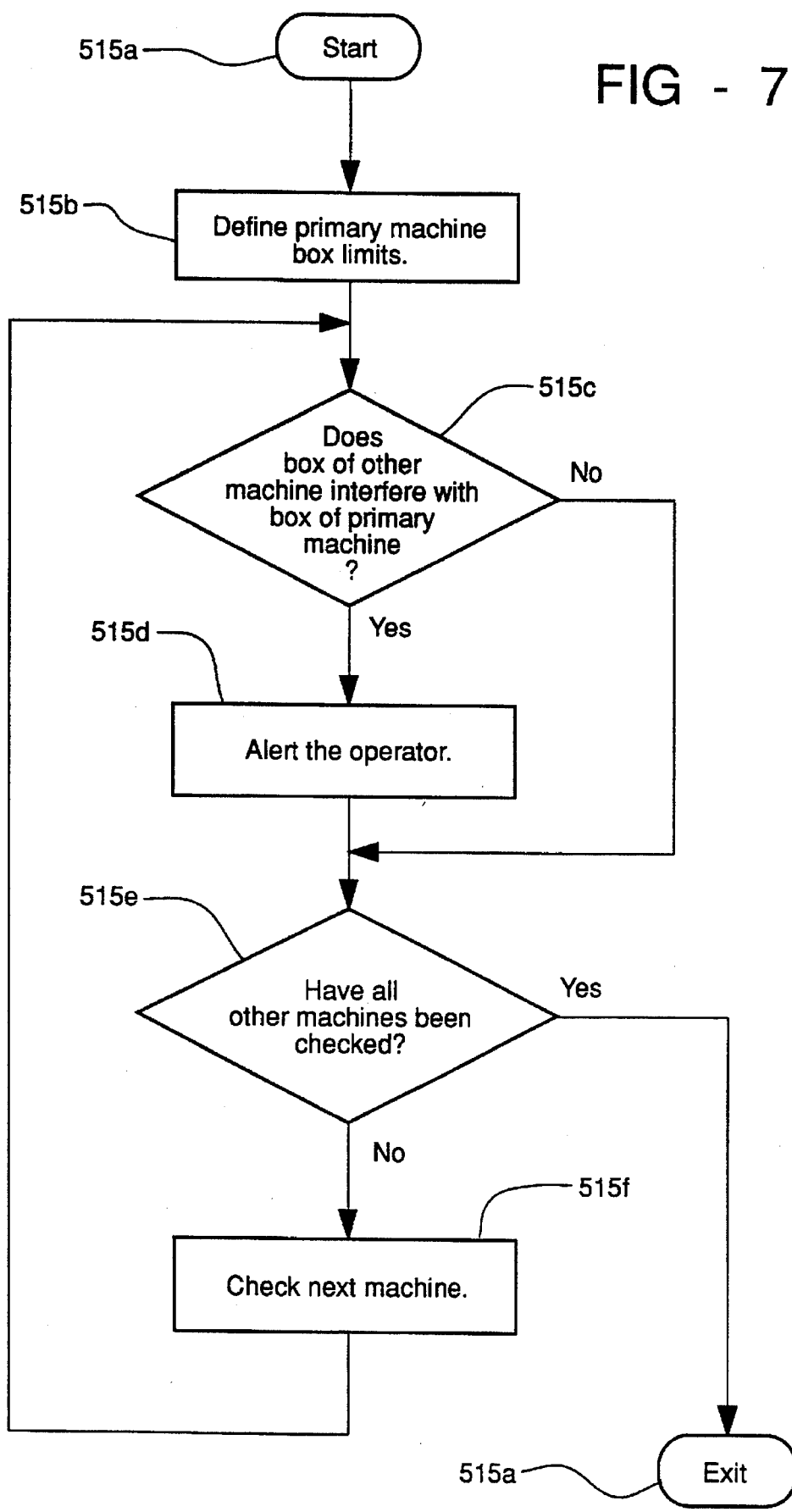

In FIG. 7H a subroutine for the icon-drawing step 591 in FIG. 7C is illustrated for coordinating the display of multiple machines on the operator display screen. At step 591a the system matches the mixed position/ID signal from the machine whose position is currently being evaluated to a set of corresponding machine parameters from an accessible library. The ID for each machine is preferably stored in the database on each machine, such that the common database effectively has each machine "tagged" for identification. When a match is found, the icon size and orientation are calculated in the three-dimensional coordinates of the display 70. At step 591b the system determines whether the coordinates match those of icon 82 representing the first or "home" compactor. If yes, the system is set to color that icon in the appropriate manner, for example by painting it green, at step 591d. If at step 591b the display window coordinates calculated for the current icon are determined not to represent the first compactor icon 82, the system is set to visually distinguish the current icon, for example by coloring it red at step 591c. At step 591e the icon is then drawn on the plan window with the appropriate color or other visual characteristic distinguishing it from the other icon(s) on the display.

Still referring to FIG. 7H, at step 591f the icon currently being evaluated is provided with a boundary box 83 as described above, for example in the illustrated embodiment representing one meter of clearance around the machine. The subroutine of FIG. 7H is repeated for each compactor at step 591 as the system successively evaluates each machine operating on the site. It will be apparent that the subroutine of FIG. 7H is easily expanded to accommodate more than the two illustrative machines.

Referring now to FIG. 7I, a subroutine for step 515a in FIG. 7A is illustrated for monitoring a safety margin or interference boundary around each compactor. At step 515b the limits of the currently evaluated or "home" machine boundary box 83 are defined, for example to provide one meter of clearance around the machine. At step 515c the system determines whether the box of the other machine(s) interferes with the box of the primary machine as defined in step 515b. If yes, the operator is alerted at step 515d, for example with a flashing light and/or audible warning signal such as a beep or buzzer indicating the need for corrective action. If at step 515c the boxes of the two machines are determined not to interfere with one another, the subroutine proceeds to step 515c to determine whether the other machines on the site have been evaluated for interference with the home machine. If no, the next machine on the site is checked at step 515f and the subroutine is repeated. If all machines on the site have been checked, the subroutine terminates and the system returns to step 515a in FIG. 7A. In this manner the system checks for interference between each machine operating on the site in the interval between position samplings. The risk of collision or interference between machine operations is accordingly reduced or eliminated.

In FIG. 7E the subroutine for the site database update step 544 of FIG. 7D is shown. Referring to FIG. 7E, at step 550 the system determines whether the elevation of the current grid element has been initialized. If not, the elevation or z-axis coordinate of that grid element is initialized as equal to the currently measured compactor wheel elevation at that point. If the grid element elevation has already been initialized, the system proceeds to step 554 to compare the currently measured wheel elevation to the previously measured elevation for that grid element. If the currently measured wheel elevation on that grid element is not greater than the previously measured elevation, the system determines that no new material has been added and that grid element can be incremented at step 558 to register a compaction pass and increment the pass count for that grid element. If at step 554 the currently measured wheel elevation is greater than the previously measured elevation (discounting, for example, minor resilient expansion of the material compressed in the last pass, within limits determined by the user) the system determines at step 556 that a new lift of asphalt, earth or waste material has been detected for that grid element, and the pass count status for that grid element is re-zeroed to indicate the need for a complete new series of compaction passes. At step 560 the elevation of the current grid element is then set equal to the currently measured elevation of the compactor wheel for comparison at step 554 on the next pass of the compactor over that grid element. The subroutine of FIG. 7E is then exited for completion of the subroutine loop of FIG. 7D.

Referring now to FIGS. 7F–7G, a subroutine for step 546 of FIG. 7D is shown. Once the pass count for the current grid element has been updated at step 544 in FIG. 7D using the subroutine of FIG. 7E, the system in step 546 enters the subroutine of FIGS. 7F–7G and at step 562 first determines the location and size of the current grid element for that compactor on the site database displayed in plan window 70 on the operator screen 22. At step 564, if the pass count for the grid element is zero, the grid element is set, for example, to be colored black on the display at step 566. If the pass count for that grid element is determined to be one at step 568, the grid element is set, for example, to be colored yellow on the display at step 570. If the pass count for that grid element is determined at step 572 to be two, the grid element is set, for example, to be colored green at step 574. If the pass count is determined at step 576 to be three, the grid element is set, for example, to be colored red at step 578. If the pass count for that grid element is determined at step 580 to be four, the grid element is set, for example, to be colored blue at step 582. If the pass count is determined at step 584 to be five (in the illustrated embodiment the desired pass count for a completed compacting operation), the grid is set, for example, to be colored white at step 586. If the pass count for that area is greater than the minimum pass count for a completed compaction operation, the grid element is set to be colored white at step 588.

Once the grid element has been updated according to the current pass count, the grid element is drawn and colored on the operator display screen 22 at step 590. It will be understood that the grid elements can be visually updated on screen 22 other than by coloring; e.g., by cross-hatching, shading or other visual indication.

While the tracking and updating method of FIGS. 7A–7I are illustrated for a compactor having two or more spaced compacting wheels whose width approximates the width of the site grid elements, the method can also be used for a compactor with a single wheel or roller as will be understood by those skilled in the art. The method of FIGS. 7A–7I can also be used where the width of the compactor wheel or roller does not match the width of the grid elements of the site model. However, where the width of the compacting wheel or roller is significantly greater than the width of a single grid element, for example where it covers several grid elements at one time, an alternate method for tracking the path of a compacting wheel or roller may be employed.

Figure 7J:
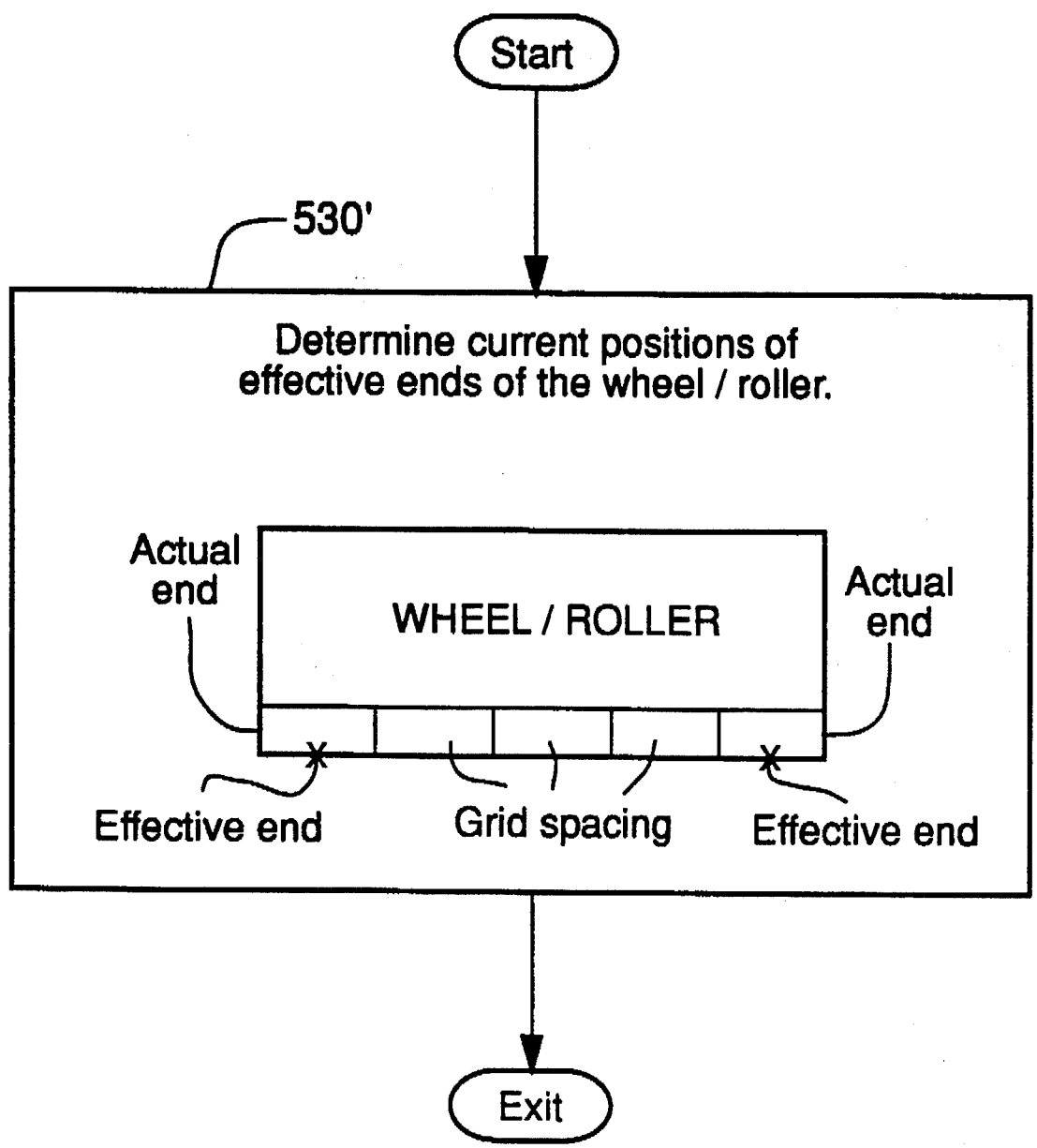
Figure 7K:
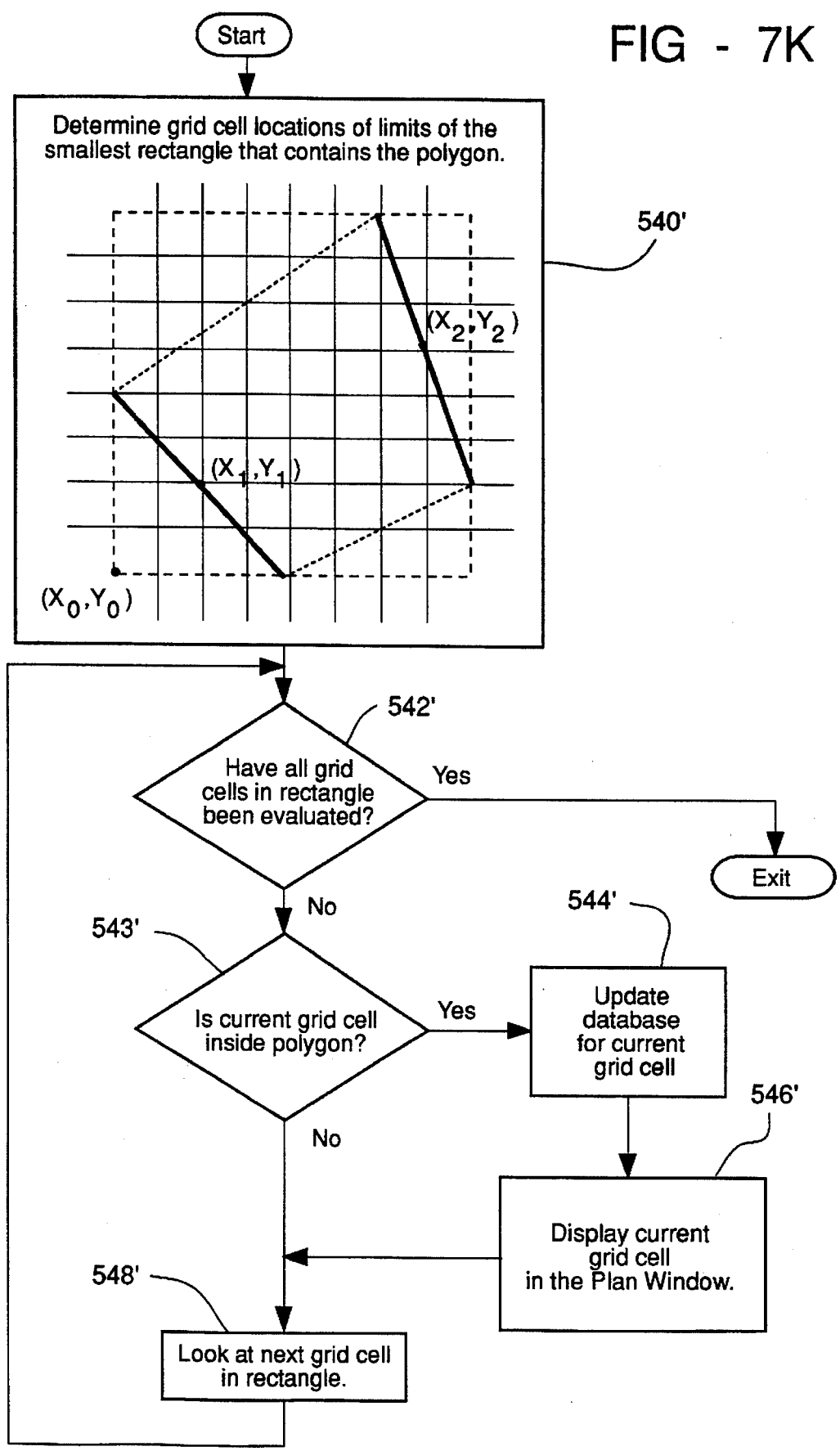

This is accomplished by replacing step 530 in FIG. 7B with step 530' from FIG. 7J, and the subroutine of FIG. 7D with the subroutine of FIG. 7K. Referring to step 530' in FIG. 7J, the system designates "effective" wheel or roller ends inboard from the actual ends. In the illustrated embodiment the effective ends are recognized by the differencing algorithm as inboard from the actual end a distance approximately one half the width of a grid element. For example, if the actual wheel width is 5.0 feet, corresponding to five 1.0 foot×1.0 foot grid elements, the effective locations of the wheel ends can be calculated, for example, one half foot inboard from each actual end. If the effective (non-actual) wheel ends of the compactor pass over any portion of a grid element on the digitized site model, that grid element is read and manipulated by the differencing algorithm as having been compacted, since in actuality at least one half of that grid element was actually passed over by the wheel. Of course, the amount of wheel end offset can vary depending on the size of the grid elements and the desired margin of error in determining whether the wheel has passed over a grid element.

While the algorithm of step 530' in FIG. 7J compensates for the lack of complete correspondence between the width of the compacting wheel or roller and the number of grid elements completely traversed by the wheel or roller, the distance and direction changes which the wheel makes between GPS position readings results in a loss of real time update information over a portion of the compactor's travel. This is particularly acute where compactor travel speed is high relative to the grid elements of the site plan. For example, where the grid elements are one meter square and the sampling rate of the position system is one coordinate sample per second, a machine traveling at 18 km per hour travels approximately five meters or five grid squares between position samplings. Accordingly, there is no real time information with respect to at least the intermediate three of the five grid squares covered by the machine. To solve this problem a "fill in the polygon" algorithm as shown in FIG. 7K is used to estimate the path traversed by the machine between coordinate samplings. In FIG. 7K the algorithm at step 540' locates a rectangle on the site plan grid surface defined by the effective ends of the compactor wheel at positions (x1, y1) and (x2, y2) and coordinate position (x0, y0). At steps 542', 543' and 548' a search algorithm searches within the rectangle's borders for those grid elements within a polygon defined between the two wheel positions; i.e., those grid elements traversed by the wheel between its effective ends.

The machine path tracking method of FIGS. 7J and 7K is also useful for tracking earth-contouring machinery, for example a tractor having a dozer blade, by substituting the width of the blade or tool on the earth-contouring machine for wheel/roller width in step 530'.

At steps 544' and 546' the database and display are updated as described at steps 544 and 546, respectively, in FIGS. 7D–7F.

While the illustrated embodiment of a compacting application is a pass-count based system, it will be apparent that other update protocols can be employed. For example, the change in amount of compaction per pass over a grid element can be determined by checking the elevation change since the last pass, and when the change in elevation on a particular pass is below a certain value (indicating that the garbage is near the desired compaction density), that grid element is updated on the screen as completed. Another method is to use an absolute compaction standard, registering a particular grid element as finished when the material thereon has been compacted from an uncompacted or initial elevation to a predetermined lower elevation.

It will be apparent to those skilled in the art that the principles of the present invention, i.e., multiple machine monitoring and coordination via the creation of a common, dynamically-updated site database created with shared machine position information, is not limited in utility to the exemplary landfill compacting operation described above. The inventive method and apparatus can be applied to virtually any earth-moving, contouring or compacting operation in which mobile geography-altering machinery using real time three-dimensional positioning and a dynamically updated site database are operating on a common site.

For example, referring to FIG. 8 a display screen can be generated for an alternate application of the present invention in which multiple earth contouring machines such as tractors with dozer blades are operating on a site to contour the topography to a desired state. The method and apparatus for generating a dynamically updated database for such machines is similar to the method and apparatus described above for a compacting machine; as noted above, the machine path tracking method of FIGS. 7J and 7K can be used for tracking earth contouring machinery simply by substituting blade width for wheel/roller width. While the difference between the actual and desired site models in the illustrated compacting application is determined and displayed as an incremental pass count, for earth-contouring the difference can be determined by comparing the machine's current elevation coordinate to the desired or target elevation at that point, and the site database updated at that point to indicate whether the actual topography is above, at, or below the target. The sharing of position information to create a common, dynamically-updated database as described above for a particular compacting operation can be modified accordingly by those skilled in the art. With the general principles and a specific application of the present invention set forth above, those skilled in the art will be able to carry it out.

For example, referring to FIG. 8 an operator display on screen 22 for an earth-contouring application can be generated by equipping two earth-contouring machines with the position and update modules 50,60 described above. The display has as a principal component a two-dimensional digitized site model in plan window 70 showing the desired final contour or plan of site 12 (or a portion thereof) relative to the actual topography. On an actual screen display 70 the difference between the actual site topography and the desired site model can be represented by color coding used to show areas in which earth must be removed, areas in which earth must be added, and areas which have already achieved conformity with the finished site model. The differently shaded or cross-hatched regions on the site displayed in window 70 in FIG. 8 graphically represent the varying differences between the actual site topography and desired site topography, updated in real time for each machine on the site.

Operator display screen 22 includes a horizontal coordinate window or display 72 at the top of the screen, showing the position of the "home" machine 82 in three dimensions relative to base reference 16. Coarse and fine resolution sidebar scales 74,75 show the elevational or z-axis deviation from the target contour elevation, providing an indicator of how much the tractor's blade should cut or fill at that location. The coarse indicator 74 on the right shows scaled elevation of 1.0 foot increments above and below the target elevation; the fine resolution side bar 75 of the left side of the display lists 0.1 foot increments and provides a convenient reference when the operator is within a foot or less of the target contour. Using "zoom" or "autoscaling" features in the display software, the scales 74,75 can be changed to smaller increments as the operator nears the target topography.

A further reference is provided to the machine operator in profile window 76 at the bottom of screen 22. Profile window 76 shows the elevational difference between the actual site topography 76a and the desired topography 76b in the path of and immediately behind the "home" machine. An elevation scale 78 on the left side of profile display 76 can provide an additional indicator of how deep to make a cut or how much earth to add at a given location, while the horizontal scale 79 at the bottom of profile display 76 indicates the distance ahead of the tractor/blade at which the operator will encounter certain actual and desired topography differences. In this manner the operator can simultaneously monitor the upcoming terrain and the accuracy of the most recent pass in achieving the target contour, and adjust operations accordingly.

The position of two tractors on site 12 is displayed graphically on screen 22 as tractor blade icons 82,82' superimposed on the plan window 70. Only the "home" machine icon 82 appears in the profile window 76, and the appropriate sidebar scale 74,75. In the site plan window 70 icons 82,82' are provided with forward-projecting direction indicators 84,84', which serve to identify the terrain a fixed distance ahead of the tractors in their direction of travel. The anticipated terrain shown in front of "home" tractor icon 82 in profile window 76 corresponds to that portion of site 12 covered by direction indicator 84. While icon 82 in windows 70,74,75 moves in response to the current position of the machine relative to the site, the icon 82 in profile window 76 remains centered while the site topography profiles 76a,76b scroll past it according to machine movement.

With the detailed position and site update information for both tractors 82,82' provided to the operator via display 22 the operator has a complete, up-to-date, real-time display of the entire site, both tractors and their progress to date, and their success in achieving the desired topography.

It will be understood by those skilled in the art that the inventive method and apparatus illustrated in FIGS. 1–7 for compacting operations can be applied to multiple earth-contouring machines as shown in FIG. 8, or indeed to any geography-altering machine, with minor variations for the operating characteristics of the machinery and the manner in which the site is being altered to the desired state.

Figure 9:
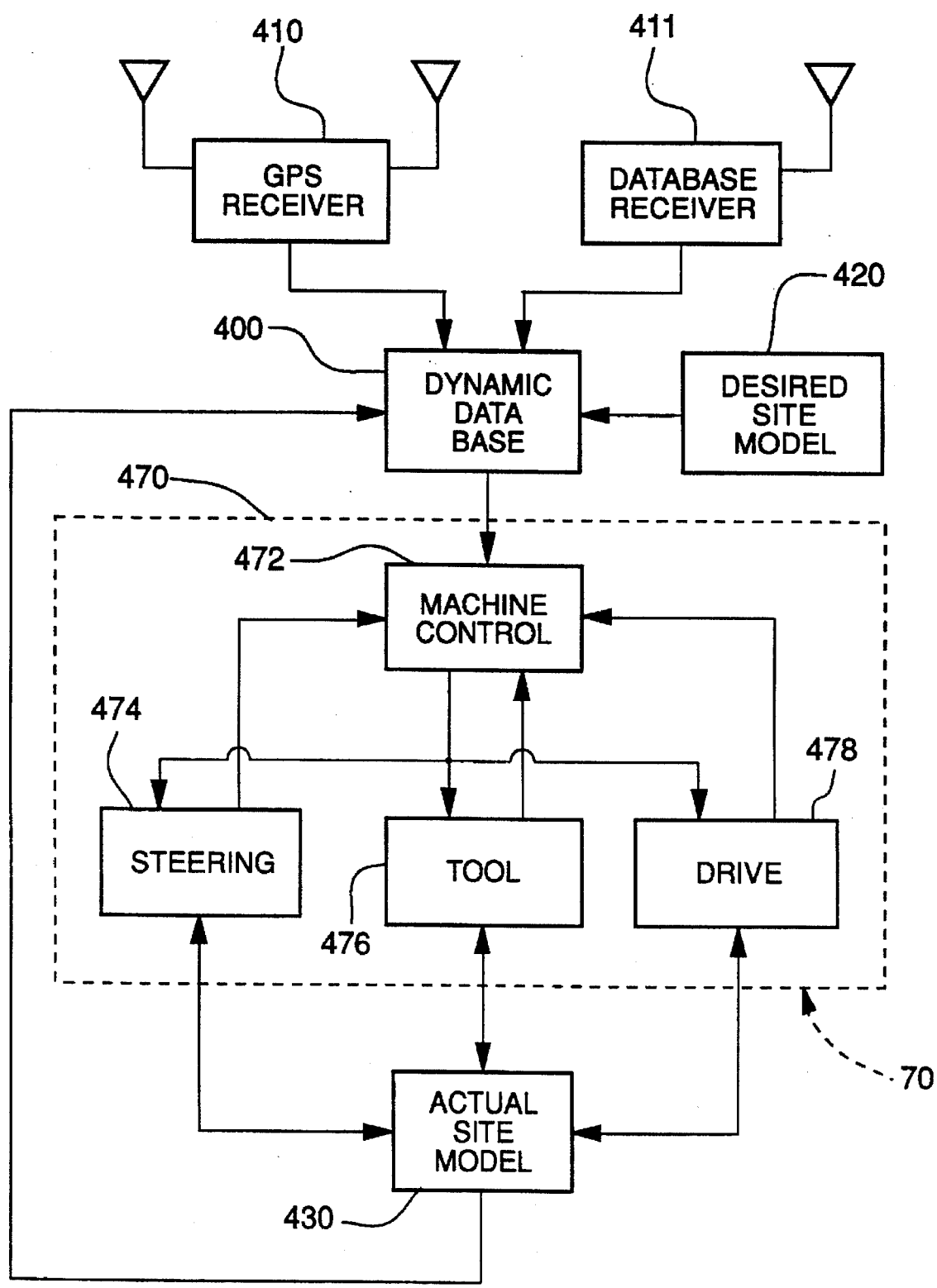
FIG. 9 is a schematic representation of an apparatus according to the present invention in a system with closed-loop automatic machine controls.

Referring now to FIG. 9, an alternate system is schematically shown for closed-loop automatic control of one or more operating systems on a machine. While the embodiment of FIG. 9 is capable of use with or without a supplemental operator display as described above, for purposes of this illustration only automatic machine controls are shown. A suitable digital processing facility, for example a computer as described in the foregoing embodiments, containing the algorithms of the dynamic database of the invention is shown at 400. The dynamic database 400 receives 3-D instantaneous position information from GPS receiver system 410, and the shared position information from other machines via database radio 411. The desired site model 420 is loaded or stored in the database of computer 400 in any suitable manner, for example on a suitable disk memory. Automatic machine control module 470 contains electrohydraulic machine controls 472 connected to operate, for example, steering and drive systems 474,476,478 on the compacting machine. Automatic machine controls 472 are capable of receiving signals from the dynamic database in computer 400 representing the difference between the actual site model 430 and the desired site model 420 to operate the steering and drive systems of the compactor to traverse the site in a manner to bring the actual site model into conformity with the desired site model. As the automatic machine controls 472 operate the steering and drive systems of the machine, the compaction of the site and the current position and direction of the compactor are received, read and manipulated by the dynamic database at 400 to update the actual site model. The actual site update information is received by database 400, which correspondingly updates the signals delivered to machine controls 472 for operation of the steering and drive systems of the compactor as it makes compacting passes over the site to bring the actual site model into conformity with the desired site model.

Additionally, the automatic machine controls 472 can be controlled by signals from the database to alter the machine's course in the event that interference with another machine is detected as described in FIG. 7I.

The illustrated embodiments of the present invention are provided to further an understanding of the broad principles of the invention, and to disclose in detail a preferred application. Many other modifications or applications of the invention can be made and still lie within the scope of the appended claims.

We claim:

1. Apparatus for monitoring and coordinating the operations of multiple mobile geography-altering machines on a work site, comprising:

site database means for storing a site model representing the geography of the site;

means for generating digital position signals representing in real time the instantaneous three-dimensional site coordinate position of a first machine and a second machine as they traverse and alter the site;

means for receiving said position signals and for updating the site model in accordance with the position signals from the first and second machines to create a common site database comprising the real time updated geography of the site as it has been altered by the machines and the real time position of the machines with respect to the real time, updated geography of the site; and means for directing the operation of the first machine relative to the second machine in real time in accordance with the real time updated geography of the common site database as the machines traverse the site.

2. Apparatus as defined in claim 1, wherein the site database means is located remotely from the machines.

3. Apparatus as defined in claim 1, wherein the site database means is located on one of the first and second machines.

4. Apparatus as defined in claim 1, wherein the site database means is located on both the first and second machines.

5. Apparatus as defined in claim 4, wherein each machine provided with a site database means further includes communication means to send and receive the position signals to and from the site database means on the other machine.

6. Apparatus as defined in claim 5, wherein the communication means comprise asynchronous broadcasting means timed such that only one machine per unit time broadcasts its position signal to the other machine.

7. Apparatus as defined in claim 1, wherein the means for generating position signals include means for asynchronously broadcasting the position signals from each machine to the means for receiving said signals.

8. Apparatus as defined in claim 7, wherein the broadcasting means further include ID signal means to broadcast a machine-identification signal with the position signal.

9. Apparatus as defined in claim 8, wherein the means for updating the site model further includes machine parameter library means to match machine parameters to the ID signal from a machine.

10. Apparatus as defined in claim 1, wherein the means for directing the operation of the machine include operator display means.

11. Apparatus as defined in claim 10, wherein the operator display means include a display of the site model and the position of the first and second machines on the site model.

12. Apparatus as defined in claim 1, further including means for monitoring the operation of the first and second machines relative to one another to prevent interference between them.

13. Apparatus as defined in claim 12, wherein the means for monitoring the operation of the first and second machines include means for defining a machine interference boundary around a machine and providing a warning signal in response to the position of another machine being determined to be within that boundary.

14. Apparatus as defined in claim 12, wherein the means for monitoring the operation of the first and second machines include means for defining a machine interference boundary around the first and second machines and providing a warning signal in response to the boundary of one machine being determined to overlap the boundary of the other machine.

15. Apparatus as defined in claim 14, further including means for altering the size of the interference boundary for a machine in accordance with the machine's mode of operation.

16. Apparatus as defined in claim 14, wherein the machine interference boundary comprises multiple boundaries of different size simultaneously defined around a machine.

17. Apparatus as defined in claim 13, wherein the means for monitoring the operation of the first and second machines include an operator display of the site model showing the position of the first and second machines on the site model and their respective interference boundaries.

18. An apparatus for monitoring and coordinating the operations of multiple mobile geography-altering machines on a work site, comprising:

at least two mobile geography-altering machines, each equipped with means for generating signals representing in real time an instantaneous three-dimensional site coordinate position of the machine as it traverses the site;

digital data storage and retrieval means on each machine for storing a site model representing geography of the site;

dynamically updated site database means on each machine for receiving that machine's position signals and for updating the site model in real time in accordance therewith to reflect alterations made to the geography of the site by that machine;

means on each machine for transmitting that machine's position signals to another machine, and for receiving position signals from another machine;

means for additionally updating the site database on each machine in accordance with the position signals from another machine to create a dynamically updated common site database comprising the real time updated geography of the site as it has been altered by the machines and the real time position of the machines with respect to the real time updated geography of the site; and means for directing the operation of each machine relative to the other machines in accordance with the real time updated geography of the common site database.

19. Apparatus as defined in claim 18, wherein the means for directing the operation of each machine include operator display means on each machine showing in real time the updated site model and position of each machine.

20. Apparatus as defined in claim 19, wherein the means for monitoring the operation of the first and second machines include means for defining a machine interference boundary around the first and second machines and providing a warning signal in response to the boundary of one machine being determined to overlap the boundary of the other machine.

21. Apparatus as defined in claim 20, further including means for altering the size of the interference boundary for a machine in accordance with the machine's mode of operation.

22. A method of directing the operation of a mobile geography-altering machine on a work site relative to other such machines operating on the work site, comprising:

producing and storing in a digital data storage and retrieval means a site database including a site model representing a geography of the site;

generating signals representing in real time an instantaneous three-dimensional site coordinate position of a first machine and a second machine as they traverse and alter the site;

updating the site database in accordance with the position signals from the first and second machines to create a dynamically updated common site database comprising a real time updated geography of the site as it has been altered by the machines and the real time position of the machines with respect to the real time updated geography of the site; and directing the operation of the first machine relative to the second machine in accordance with the real time updated geography of the common site database.

23. A method as defined in claim 22, wherein the step of directing the operation of the first machine relative to the second machine includes the step of providing an operator display of the common site database on the first machine.

24. A method as defined in claim 23, wherein the operator display includes a display of the site model and the position of the first and second machines on the site model.

25. A method of directing the operations of a mobile geography-altering machine on a work site relative to other such machines operating on the work site, comprising:

equipping two mobile geography-altering machines with means for generating signals representing in real time instantaneous three-dimensional site coordinate positions of the machines as they traverse and alter the site;

providing digital storage and retrieval means on each machine for storing a site model representing the geography of the site;

providing a dynamically-updated site database on each machine for receiving the position signals from that machine and for updating the site model in real time in accordance therewith to reflect alterations made to the geography of the site by that machine;

providing means on each machine for transmitting its position signals to the other machine, and for receiving the other machine's position signals;

additionally updating the site database on each machine in accordance with the position signals from the other machine to create a common, dynamically-updated site database comprising the real time updated geography of the site as it has been altered by the machines and the real time position of the machines with respect to the real time updated geography of the site; and directing the operation of each machine relative to the other machine in accordance with the real time updated geography of the common site database.

26. Apparatus as defined in claim 25, wherein the means for directing the operation of each machine includes operator display means showing in real time the updated site model and position of each machine.

27. Apparatus as defined in claim 25, further including means for monitoring the operation of each machine relative to the other machines to prevent interference between them.

28. A method as defined in claim 27, wherein the step of monitoring the operation of the first machine relative to the second machine further includes the step of defining a machine interference boundary around a machine and providing a warning signal when the position of another machine is determined to be within that boundary.

29. A method as defined in claim 27, further including the step of defining a machine interference boundary around each machine and providing a warning when the boundary of one machine is determined to overlap the boundary of the other machine.

30. An apparatus for directing the operations of multiple mobile geography-altering machines in three-dimensional space relative to a land site using three-dimensional position signals and a digitized model of the site, comprising:

a plurality of mobile geography-altering machines each equipped with means for receiving the position signals and for determining the instantaneous position in three-dimensional space of at least a portion of each machine as it traverses the site:

actual and desired models of the site geography stored in a digital data storage facility;

a common, dynamically-updated database means communicating with the position determining means of each machine and the digital data storage facility, the database means including means for determining the difference between the actual and desired site models, means for updating the actual site model in real time to reflect the alterations made to the geography of the site by each machine, means for updating the difference between the actual and desired site models in real time according to the alterations made to the geography of the site by each machine, and means for directing the operation of the machines relative to one another and the alterations made to the geography of the site in accordance with the updated difference between the actual and desired site models.

31. A method for directing the operation of multiple mobile geography-altering machines in three-dimensional space relative to a common work site using three-dimensional position signals and a digitized model of the site, the method comprising the steps of:

equipping a plurality of machines to receive the position signals and determine their instantaneous positions in three-dimensional space as they traverse the site;

storing actual and desired site models in a digital data storage facility;

generating a common, dynamically-updated site database by updating the site model in real time to reflect the alterations made to the geography of the site by each machine, updating the difference between the actual and desired site models in real time according to the alterations made to the geography of the site by each machine, and directing the operation of the machines relative to one another and the alterations made to the geography of the site in accordance with the updated difference between the actual and desired site models.

* * * * *